US012486907B2

(12) United States Patent
Dixon et al.

(10) Patent No.: US 12,486,907 B2
(45) Date of Patent: Dec. 2, 2025

(54) SPRING RETURN VALVE HANDLE ARRANGEMENTS

(71) Applicant: Swagelok Company, Solon, OH (US)

(72) Inventors: Matthew Dixon, Parma, OH (US); Joseph Bashover, Lakewood, OH (US); R. Scott Headings, Chesterland, OH (US); Karim Mahraz, Willoughby, OH (US); Ercan Balikci, Solon, OH (US); Kristopher Scott Owens, Brook Park, OH (US); Samuel Gunther Houser, Southington, OH (US); Michael Bestic, Lyndhurst, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 18/355,013

(22) Filed: Jul. 19, 2023

(65) Prior Publication Data

US 2024/0026981 A1    Jan. 25, 2024

Related U.S. Application Data

(60) Provisional application No. 63/494,261, filed on Apr. 5, 2023, provisional application No. 63/390,683, filed on Jul. 20, 2022.

(51) Int. Cl.
*F16K 5/06*     (2006.01)
*F16K 31/56*    (2006.01)

(52) U.S. Cl.
CPC .......... *F16K 5/0647* (2013.01); *F16K 31/563* (2013.01); *F16F 2238/024* (2013.01); *F16K 2200/305* (2021.08)

(58) Field of Classification Search
CPC .... F16K 5/0647; F16K 5/0242; F16K 5/0442; F16K 31/563; F16K 31/566;
(Continued)

(56) References Cited

U.S. PATENT DOCUMENTS

| 32,444 A | 5/1861 | DeBolle |
| 232,050 A | 9/1880 | Moran |

(Continued)

FOREIGN PATENT DOCUMENTS

| CA | 2641300 A | 9/2005 |
| CN | 201795079 | 4/2011 |

(Continued)

OTHER PUBLICATIONS

Office action from Chinese Application No. 202280008266.3 dated Jan. 17, 2024.

(Continued)

*Primary Examiner* — Kenneth Rinehart
*Assistant Examiner* — Jonathan J. Waddy
(74) *Attorney, Agent, or Firm* — Calfee, Halter & Griswold LLP

(57) ABSTRACT

A spring return cartridge for a rotary actuated valve includes a torsion spring having a spring-loaded intermediate portion extending between first and second end portions and a spring carrier sleeved with the torsion spring. The spring carrier includes a first portion rotationally fixed with the first end portion of the torsion spring, and a second portion rotatably coupled with the second end portion of the torsion spring, such that the second end portion of the torsion spring is rotatable with respect to the spring carrier, and with respect to the first end portion of the torsion spring, between first and second rotational limit positions, with the intermediate portion of the torsion spring biasing the torsion spring second end portion to the first rotational limit position and maintaining a spring-loaded condition in the first rotational limit position.

20 Claims, 12 Drawing Sheets

(58) Field of Classification Search
CPC ........... F16K 2200/305; F03B 1/026; F16F 2236/08; F16F 2238/024; F16F 1/48
USPC ....... 251/242, 243, 244, 245, 246, 253, 255, 251/262, 263, 303, 313, 337
See application file for complete search history.

(56) References Cited

U.S. PATENT DOCUMENTS

| | | | |
|---|---|---|---|
| 521,915 A * | 6/1894 | Page, Jr. | ........... F23D 5/00 251/313 |
| 932,188 A | 8/1909 | Strelezky | |
| 979,344 A | 12/1910 | Shallow | |
| 992,502 A | 5/1911 | Hollis | |
| 1,011,260 A | 12/1911 | Spinney | |
| 1,499,446 A * | 7/1924 | Code | ........... F16K 5/0414 251/313 |
| 1,794,581 A * | 3/1931 | Burdick | ........... E03B 9/20 285/8 |
| 2,061,716 A | 11/1936 | Best | |
| 2,768,806 A | 10/1956 | Topie | |
| 3,461,894 A | 8/1969 | Maclennan | |
| 3,827,671 A | 8/1974 | Bolden | |
| 3,940,107 A | 2/1976 | Allenbaugh, Jr. | |
| 4,171,920 A * | 10/1979 | Kramer | ........... F16F 1/14 267/153 |
| 4,270,849 A * | 6/1981 | Kalbfleisch | ........... F16K 17/386 137/75 |
| 4,301,823 A | 11/1981 | Meisenheimer, Jr. | |
| 4,376,445 A | 3/1983 | Meisenheimer, Jr. | |
| 4,779,840 A | 10/1988 | Andrea | |
| 4,867,415 A * | 9/1989 | Andrea | ........... F16K 5/0647 251/288 |
| 7,264,016 B2 * | 9/2007 | Molina | ........... F16K 11/207 137/454.6 |
| 8,002,236 B2 * | 8/2011 | Myers | ........... F16K 35/16 251/285 |
| 9,032,993 B2 | 5/2015 | Barton | |
| 10,267,294 B2 | 4/2019 | Chapman | |
| 11,079,039 B2 | 8/2021 | Karber | |
| 11,698,144 B2 * | 7/2023 | Dixon | ........... F16K 31/602 251/270 |
| 11,754,196 B2 | 9/2023 | Nirkhe | |
| 12,038,100 B2 * | 7/2024 | Dixon | ........... F16K 5/0647 |
| 2017/0321404 A1 * | 11/2017 | Wiwi | ........... F16K 3/0281 |
| 2018/0099318 A1 * | 4/2018 | Wiwi | ........... B08B 9/055 |
| 2019/0048856 A1 * | 2/2019 | Morteza | ........... F15B 15/261 |
| 2020/0096126 A1 * | 3/2020 | Zajac | ........... F16K 5/061 |
| 2022/0042496 A1 | 2/2022 | Chapman | |
| 2022/0412324 A1 * | 12/2022 | Chapman | ........... F16K 31/043 |

FOREIGN PATENT DOCUMENTS

| | | |
|---|---|---|
| CN | 206130225 | 4/2017 |
| CN | 111475894 A | 7/2020 |
| CN | 212360981 | 1/2021 |
| CN | 112664597 | 4/2021 |
| GB | 2592068 | 8/2021 |
| JP | S5012194 | 2/1975 |
| JP | S56115077 | 9/1981 |

OTHER PUBLICATIONS

Office action from Chinese Application No. 202280008266.3 dated Jul. 23, 2024.
International Search Report and Written Opinion from PCT/CN2023/070465 dated Nov. 2, 2023.
One page brochure, Mechatest B.V., Spring Return Handle, Mechatest for Swagelok Valves, published before Jan. 15, 2021.
One page brochure, Kinetrol USA, Spring Return "Deadman" Handles: Certainty of Valve Position When Unattended, published before Jan. 15, 2021.
One page brochure, Mechatest B.V., Spring Return Handle, Mechatest for Swagelok and Hoke Valves, published before Jan. 15, 2021.
International Search Report and Written Opinion from PCT/US2022/011074 dated Apr. 20, 2022.

* cited by examiner

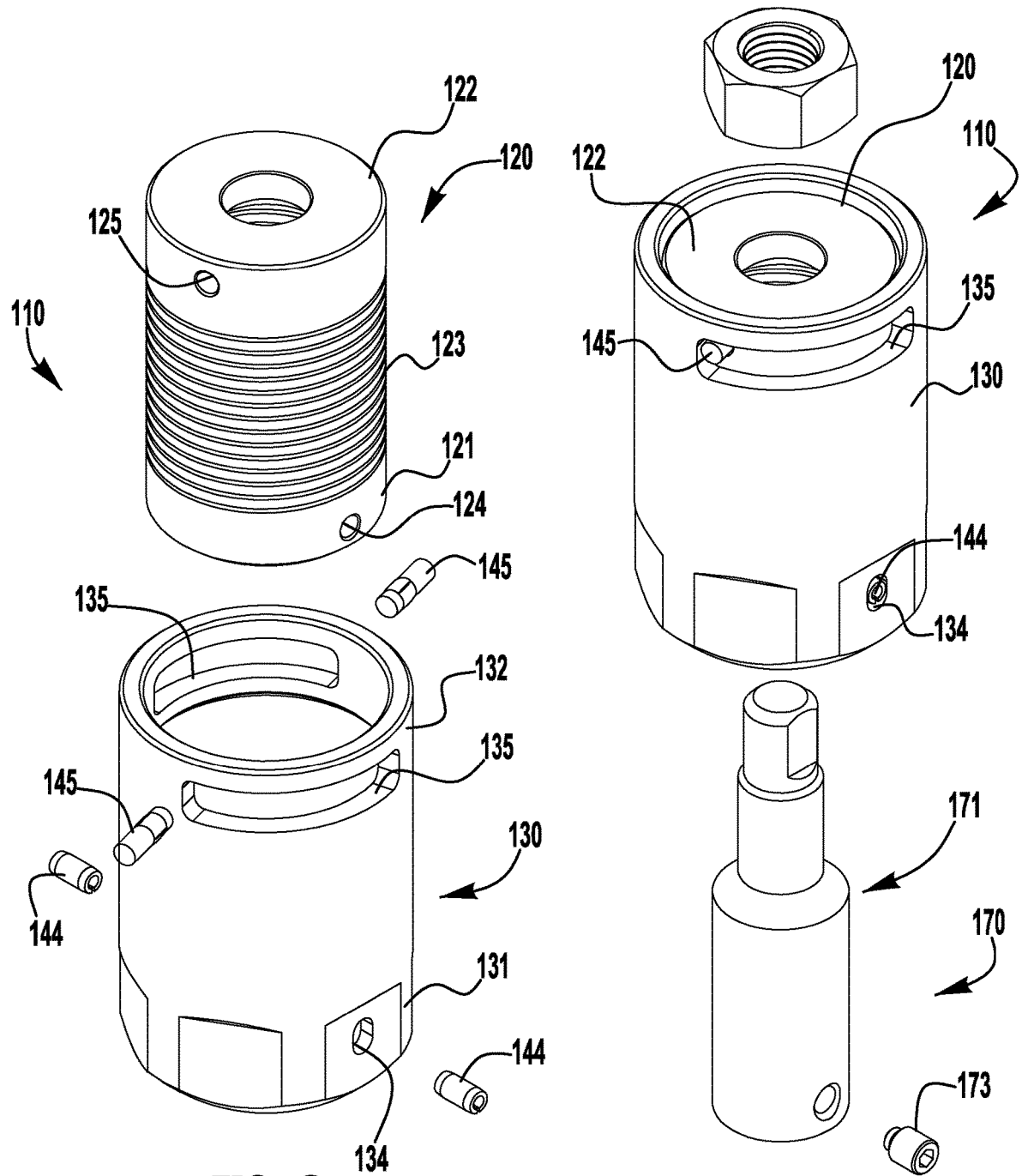

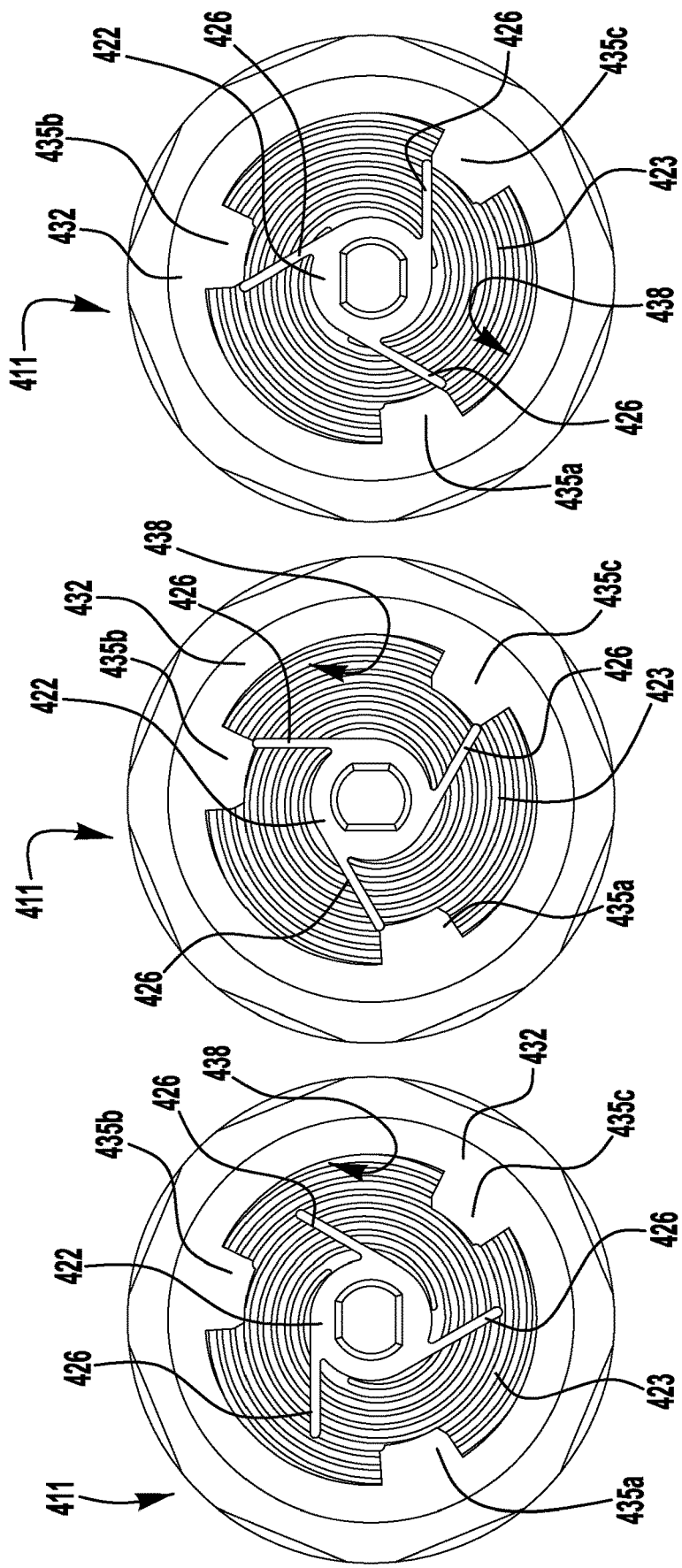

SPRING RETURN VALVE HANDLE ARRANGEMENTS

CROSS-REFERENCE TO RELATED APPLICATIONS

This application claims priority to and all benefit of U.S. Provisional Patent Application Ser. No. 63/390,683, filed on Jul. 20, 2022, for SPRING RETURN VALVE HANDLE WITH PRELOADED SPRING RETURN SUBASSEMBLY, and U.S. Provisional Patent Application Ser. No. 63/494,261, filed on Apr. 5, 2023, for SPRING RETURN VALVE HANDLE ARRANGEMENTS, the entire disclosures of each of which are incorporated herein by reference.

TECHNICAL FIELD

The present disclosure relates to spring return handles. More particularly, the disclosure relates to spring return valve handles for rotary actuated valves.

BACKGROUND

Manually operated fluid control valves are used in many applications. As one example, a grab sample panel provided with a primary process line includes manually operated sampling valves for selectively dispensing samples of the process fluid in sample containers or bottles. In such applications, the failure of the operator to fully close the valve (e.g., by manually rotating the valve handle to the closed position) can result in undesirable release of fluid and potential resulting safety concerns, contamination, and production losses.

SUMMARY OF THE DISCLOSURE

In accordance with an exemplary aspect of one or more of the inventions presented in this disclosure, a spring return cartridge includes a torsion spring having a spring-loaded intermediate portion extending between first and second end portions and a spring carrier sleeved with the torsion spring. The spring carrier includes a first portion rotationally fixed with the first end portion of the torsion spring, and a second portion rotatably coupled with the second end portion of the torsion spring, such that the second end portion of the torsion spring is rotatable with respect to the spring carrier, and with respect to the first end portion of the torsion spring, between first and second rotational limit positions. The intermediate portion of the torsion spring biases the torsion spring second end portion to the first rotational limit position and maintaining a spring-loaded condition in the first rotational limit position.

In some implementations, the first end portion of the torsion spring includes at least one fastener hole aligned with a corresponding fastener hole in the first portion of the spring carrier, with a fastener installed through the aligned fastener holes to rotationally secure the first end portion of the torsion spring to the first portion of the spring carrier.

In some implementations, the second end portion of the torsion spring includes at least one fastener hole aligned with a corresponding slot in the second portion of the spring carrier, with a fastener installed in the fastener hole and extending through the slot to rotatably secure the second end portion of the torsion spring to the second portion of the spring carrier.

In some implementations, the first end portion of the torsion spring comprises a first end collar providing one or more attachment points to the first portion of the spring carrier.

In some implementations, the first end collar is integrally formed with the torsion spring intermediate portion.

In some implementations, the second end portion of the torsion spring comprises a second end collar providing one or more attachment points to the second portion of the spring carrier.

In some implementations, the second end collar is integrally formed with the torsion spring intermediate portion.

In some implementations, the torsion spring is sleeved within the spring carrier.

In some implementations, the spring-loaded intermediate portion and the first and second end portions of the torsion spring are formed as a monolithic component.

In some implementations, the spring carrier is assembled with the torsion spring.

In some implementations, the torsion spring comprises a helical spring.

In some implementations, the torsion spring comprises a spiral spring.

In some implementations, the first portion of the spring carrier comprises a lower end portion of the spring carrier and the second portion of the spring carrier comprises an upper end portion of the spring carrier.

In some implementations, the spring carrier is integrally formed with the torsion spring.

In some implementations, the torsion spring comprises a spiral spring, with the first end portion of the torsion spring comprising an outer radial portion of the spiral spring and the second end portion of the torsion spring comprising an inner radial portion of the spiral spring.

In some implementations, the second end portion of the torsion spring comprises a shaft surrounded by the spring-loaded intermediate portion of the torsion spring.

In some implementations, the spring carrier includes an inner peripheral first interlock portion and the shaft includes an outer peripheral second interlock portion radially aligned with the first interlock portion, such that the first and second interlock portions engage each other to define the first and second rotational limit positions of the torsion spring second end portion.

In some implementations, the first interlock portion comprises at least one radially inward extending projection and the second interlock portion comprises at least one arcuate recess receiving the at least one radially inward extending projection.

In some implementations, the at least one radially inward extending projection comprises a pin installed through a hole in the spring carrier second portion.

In some implementations, the shaft includes a lower bore portion for receiving a valve stem of the rotary actuated valve when the spring return cartridge is installed on the rotary actuated valve.

In some implementations, the shaft includes an upper stem extension configured for attachment to a valve handle.

In some implementations, the shaft includes an upper bore portion for receiving a stem extension, the stem extension being configured for attachment to a valve handle.

In some implementations, the spring return cartridge further comprises a stem extension installed in the upper bore portion.

In some implementations, the spring return cartridge further comprises a cover plate secured to the shaft and covering upper ends of the spring carrier and the torsion spring.

In accordance with an exemplary aspect of one or more of the inventions presented in this disclosure, a spring return cartridge includes a torsion spring having an outer radial first end portion and an inner radial second end portion, a spring carrier surrounding the torsion spring and rotationally fixed with the outer radial first end portion, and a shaft surrounded by the torsion spring and rotationally fixed with the inner radial second end portion.

In some implementations, the spring carrier is rotatably coupled with the shaft such that the shaft is rotatable with respect to the spring carrier between first and second rotational limit positions, with the torsion spring biasing the shaft to the first rotational limit position and maintaining a spring-loaded condition in the first rotational limit position.

In some implementations, the spring carrier is integrally formed with the torsion spring.

In some implementations, the shaft is integrally formed with the torsion spring.

In some implementations, the spring carrier includes an inner peripheral first interlock portion and the shaft includes an outer peripheral second interlock portion radially aligned with the first interlock portion, such that the first and second interlock portions engage each other to define the first and second rotational limit positions of the torsion spring second end portion.

In some implementations, one of the first and second interlock portions comprises at least one radially extending projection and the other of the first and second interlock portions comprises at least one arcuate recess receiving the at least one radially extending projection, the at least one arcuate recess being shaped to define the first and second rotational limit positions.

In some implementations, the at least one radially extending projection comprises a pin installed through a hole in the spring carrier.

In some implementations, the at least one radially extending projection is integrally formed with the spring carrier.

In some implementations, the shaft includes a lower bore portion for receiving a valve stem of the rotary actuated valve when the spring return cartridge is installed on the rotary actuated valve.

In some implementations, the shaft includes an upper bore portion for receiving a stem extension, the stem extension being configured for attachment to a valve handle.

In some implementations, the spring return cartridge further comprises a stem extension installed in the upper bore portion.

In some implementations, at least one of the stem extension and the upper bore portion includes a ribbed surface providing press fit retention of the stem extension with the shaft.

In some implementations, the spring return cartridge further comprises a cover plate secured to the shaft and covering upper ends of the spring carrier and the torsion spring.

In some implementations, the shaft includes an upper stem extension configured for attachment to a valve handle.

In some implementations, the spring carrier, the torsion spring, and the shaft are formed as a monolithic component.

In some implementations, the spring carrier, the torsion spring, and the shaft are formed using additive manufacturing.

In accordance with another exemplary aspect of one or more of the inventions presented in this disclosure, a spring return handle arrangement includes a spring return cartridge (e.g., a spring return cartridge including one or more of the features described above), a user graspable valve handle, and a stem. The spring return cartridge includes a torsion spring having a spring-loaded intermediate portion extending between first and second end portions, and a spring carrier sleeved with the torsion spring and having a first portion rotationally fixed with the first end portion of the torsion spring and attachable to a valve body of the valve, and a second portion rotatably coupled with the second end portion of the torsion spring. The stem is insertable through the spring return cartridge and includes an end portion attachable to the valve handle and a stem interlock portion configured to interlock with a spring interlock portion on the second end portion of the torsion spring.

In some implementations, the stem interlock portion comprises a shoulder surface and the spring interlock portion comprises a complementary shaped counterbore surface for mating engagement with the shoulder surface.

In some implementations, the shoulder surface and the counterbore surface comprise interlocking ridged surfaces.

In some implementations, the shoulder surface and the counterbore surface comprise knurled surfaces.

In some implementations, the arrangement further comprises a nut threadable with the stem end portion and configured to be tightened against the spring interlock portion to maintain interlocking engagement between the spring interlock portion and the stem interlock portion.

In some implementations, the stem comprises a stem extension having a lower bore configured to receive a valve stem of the valve.

In accordance with another exemplary aspect of one or more of the inventions presented in this disclosure, a valve assembly includes a valve having a valve body and a rotatable valve stem extending from the valve body, and a spring return handle arrangement (e.g., a spring return handle arrangement including any of the features described above), wherein the first portion of the spring carrier is assembled with the valve body and the second end portion of the torsion spring is assembled with and rotationally fixed to the valve stem.

In some implementations, the valve body includes a bonnet portion, wherein the first portion of the spring carrier is assembled with the bonnet portion.

In some implementations, the first portion of the spring carrier is threadably assembled with the bonnet portion.

In some implementations, the valve assembly further comprises a stem extension assembled with the valve stem.

In some implementations, the stem extension includes a lower bore receiving the valve stem.

In accordance with another exemplary aspect of one or more of the inventions presented in this disclosure, a method is provided for assembling a preloaded spring return cartridge. In an exemplary method, a torsion spring is sleeved with a spring carrier. A first end portion of the torsion spring is rotationally secured with a first portion of the spring carrier. A second end portion of the torsion spring is rotated to a preloaded first rotational position. The second end portion of the torsion spring is rotatably secured to a second portion of the spring carrier in the preloaded first rotational position.

In accordance with another exemplary aspect of one or more of the inventions presented in this disclosure, a method is provided for installing a preloaded spring return cartridge and valve handle on a valve having a valve body and a stem extending therefrom. In an exemplary method, with the stem in a desired spring return rotational position, the stem is inserted through a central bore of the spring return cartridge. A spring interlock portion of the spring return cartridge is secured in mating engagement with a stem interlock portion of the stem. The valve handle is assembled with the stem.

In accordance with another exemplary aspect of one or more of the inventions presented in this disclosure, a method is provided for preloading a spring return cartridge for a rotary actuated valve, with the spring return cartridge including a torsion spring having an outer radial first end portion and an inner radial second end portion, a spring carrier surrounding the torsion spring and rotationally fixed with the outer radial first end portion, and a shaft surrounded by the torsion spring and rotationally fixed with the inner radial second end portion. In an exemplary method, the shaft is rotated with respect to the spring carrier to a first rotational limit position in which the torsion spring is in a spring loaded condition. An inner peripheral first interlock portion on the spring carrier is engaged with an outer peripheral second interlock portion on the shaft to secure the shaft in the first rotational limit position. The first interlock portion and the second interlock portion are configured to permit rotation of the shaft to a second rotational limit position defined by engagement of the first and second interlock portions, with the spring loaded torsion spring being configured to bias the shaft toward the first rotational limit position.

In some implementations, one of the first and second interlock portions comprises at least one radially extending projection and the other of the first and second interlock portions comprises at least one arcuate recess receiving the at least one radially extending projection, the arcuate recess being shaped to define the first and second rotational limit positions.

In some implementations, the at least one radially extending projection comprises a pin installed through a hole in the spring carrier.

In some implementations, the at least one radially extending projection is integrally formed with the spring carrier.

BRIEF DESCRIPTION OF THE DRAWINGS

FIG. 3 is an exploded perspective view of a preloaded spring return cartridge, according to an exemplary embodiment of the present disclosure;

FIG. 4 is a perspective view of the preloaded spring return cartridge of FIG. 3, with a stem extension, clamping nut, and set screw;

FIG. 11A is a bottom view of the spring return cartridge of FIG. 11, shown in the unloaded condition;

FIG. 11B is a bottom view of the spring return cartridge of FIG. 11, shown in a preloaded first rotational limit position; and FIG. 11C is a bottom view of the spring return cartridge of FIG. 11, shown in a second rotational limit position.

DESCRIPTION OF THE EXEMPLARY EMBODIMENTS

Figure 1:
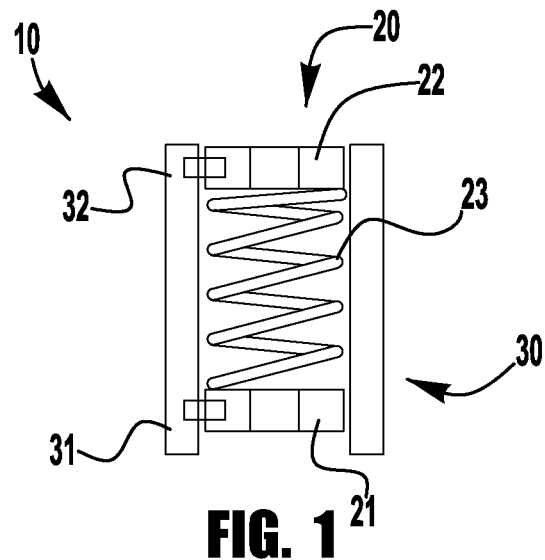
FIG. 1 is a schematic cross-sectional side view of a preloaded spring return cartridge, according to an exemplary embodiment of the present disclosure.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while an illustrated exemplary embodiment disclosed herein describes spring return valve handle arrangements for quarter-turn ball valves, the features of the present disclosure may additionally or alternatively be applied to other types of manually actuated valves (e.g., plug valves, needle valves, diaphragm valves, etc.), other rotary handle operated devices (e.g., electromechanical switch-operated devices), or devices having handles operable over different ranges of motion (e.g., half-turn or 180°, three-quarter turn or 270°, or any other suitable degree of rotation).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In many applications, it may be desirable to provide a mechanism for ensuring that a manually actuated valve (or other such device) is returned to a desired condition (e.g., closed condition) when the manual actuator (e.g., handle) is released by the operator, for example, to prevent undesired fluid flow. Such mechanisms are often referred to as "deadman's" handles. Exemplary arrangements for a spring return handle are disclosed in co-owned U.S. Pat. No. 11,698,144, entitled SPRING RETURN VALVE HANDLE, the entire disclosure of which is incorporated herein by reference.

According to exemplary aspects of the present disclosure, a spring return handle arrangement may be provided with a preloaded spring return cartridge (e.g., subassembly or monolithic component) configured to be assembled with a valve stem for providing a spring-loaded biasing rotational force to the valve stem for returning the valve stem to a first rotational limit position.

In an exemplary arrangement, as schematically illustrated in FIG. 1, a preloaded spring return cartridge 10 includes a torsion spring (e.g., helical or spiral spring) 20 sleeved with a spring carrier 30. A first (e.g., lower or outer radial) end portion 21 of the torsion spring 20 is rotationally fixed to a first portion (e.g., a lower end portion) 31 of the spring carrier 30, and a second (e.g., upper or inner radial) end portion 22 of the torsion spring is rotatably coupled to a second portion (e.g., an upper end portion) 32 of the spring carrier, such that the second end portion of the torsion spring is rotatable with respect to the spring carrier and with respect to the first end portion of the torsion spring, by torsional or twisting movement of an intermediate or medial (e.g., coiled) portion 23 of the torsion spring, between first and second rotational positions. The second end portion 22 of the torsion spring 20 may be secured to the second portion 32 of the spring carrier 30 with the intermediate spring portion 23 in a preloaded or energized condition, such that the torsion spring second end portion is held in the first rotational position absent application of a rotational force to the torsion spring second end portion. In the illustrated embodiment, the spring carrier 30 is a hollow (e.g., tubular) housing or sleeve component that surrounds the torsion spring 20. In other embodiments (not shown), the spring carrier may be surrounded by the torsion spring, while still providing for rotational fixed attachment to the first end portion of the torsion spring, and rotatable attachment to the second end portion of the torsion spring. As used herein, "sleeved with" includes arrangements in which a first component is surrounded by ("sleeved within") a second component and arrangements in which a first component surrounds ("sleeved around") a second component.

Many different arrangements may be used to rotationally secure the first end portion 21 of the torsion spring 20 to the first portion 31 of the spring carrier 30, either directly or using one or more intermediary attachment components. For example, the first end portion 21 of the torsion spring 20 may be secured to the first portion 31 of the spring carrier 30 using one or more fasteners, clamps, keyed/splined connections, threaded engagements, and/or welded portions. As one example, the first end portion of the torsion spring may be provided with one or more fastener holes or apertures that align with corresponding fastener holes or apertures in the first portion of the spring carrier, with fasteners (e.g., pins, machine screws, rivets, etc.) installed therethrough to rotationally secure the first end portion of the torsion spring to the first portion of the spring carrier.

Many different arrangements may be used to rotatably secure the second end portion 22 of the torsion spring 20 to the second portion 32 of the spring carrier 30, either directly or using one or more intermediary attachment components. For example, the second end portion 22 of the torsion spring 20 may be secured to the second portion 32 of the spring carrier using one or more fasteners, clamps, keyed/splined connections, threaded engagements, and/or welded portions. As one example, the second end portion of the torsion spring may be provided with one or more fastener holes or apertures that align with corresponding slots or cutouts in the second portion of the spring carrier, with fasteners (e.g., pins, machine screws, rivets, etc.) installed therethrough to rotatably secure the second end portion of the torsion spring to the second portion of the spring carrier.

A preloaded spring return cartridge may be used with a variety of devices, including, for example, a rotary valve assembly. As shown, the spring return cartridge may include a central bore sized to receive a valve stem therethrough, for rotational securement of the valve stem to the rotatable, spring biased second end portion 22 of the torsion spring 20.

Figure 2:
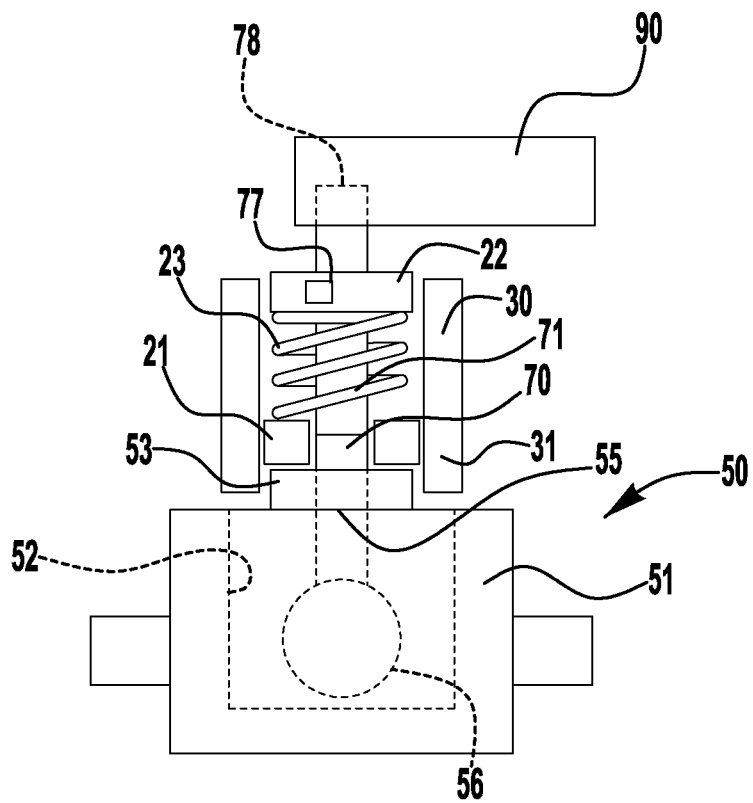
FIG. 2 is a schematic cross-sectional side view of a valve assembly including the preloaded spring return cartridge of FIG. 1, according to an exemplary embodiment of the present disclosure.
Figure 5:
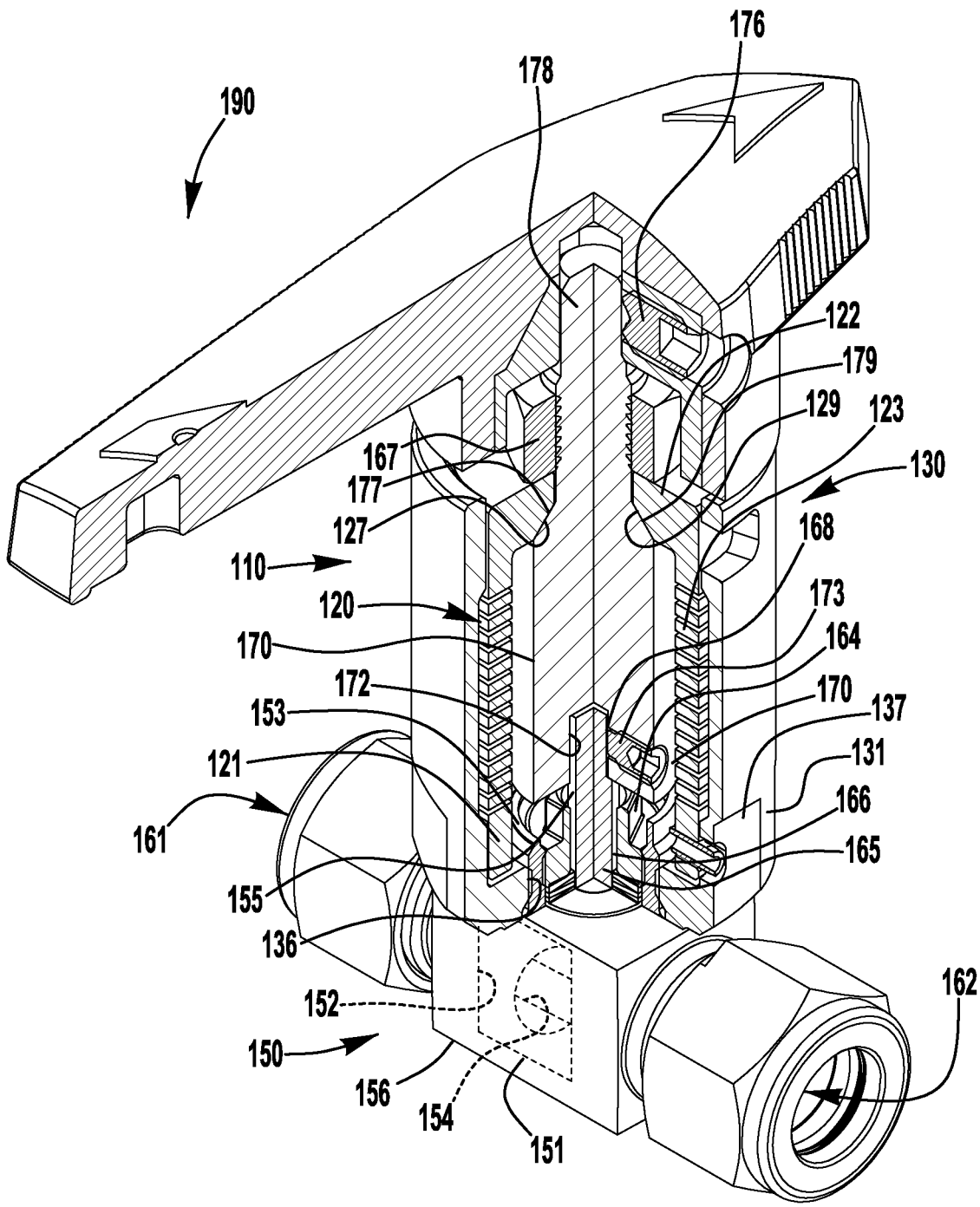
FIG. 5 is a partial cross-sectional perspective view of a valve assembly including the preloaded spring return cartridge of FIG. 3, according to an exemplary embodiment of the present disclosure.

FIG. 2 schematically illustrates the preloaded spring return cartridge 10 assembled with an exemplary rotary valve 50 and valve handle 90, for user actuation of the valve. The valve 50 includes a valve body 51 defining an interior cavity 52 retaining a valve element 56 connected to or secured with (e.g., integral to or assembled with) a stem 70. The stem 70 extends from an upper bonnet portion 53 of the valve body 51 and through a central bore of the spring return cartridge, and is rotatable between a first position (e.g., closed position, reduced flow position, first switching position), and a second position (e.g., open position, increased flow position, second switching position) to adjust the position of the valve element 56. As shown, the first portion 31 of the spring carrier 30 is rotationally fixed to the valve body 51 (e.g., to the bonnet portion 53 of the valve body), and the second end portion 22 of the torsion spring 20 is rotationally fixed to an interlock portion 77 of the stem 70. The valve handle 90 is rotationally fixed to an end portion 78 of the stem 70 (e.g., using a set screw installed through the valve handle and tightened against a flatted portion of the stem end portion), to allow for user rotation of the stem and torsion spring second end portion 22 from the first rotational position toward the second rotational position, against the biasing force of the preloaded torsion spring for example, by grasping and rotating the valve handle. Upon release of the valve handle 90, the torsion spring second end portion 22, stem 70, and valve handle are rotated by the spring biasing force back to the first rotational position.

Many different arrangements may be used to rotationally secure the first portion 31 of the spring carrier 30 to the valve body 51, either directly or using one or more intermediary attachment components. For example, the first portion 31 of the spring carrier 30 may be secured to the valve body 51 using one or more fasteners, clamps, keyed/splined connections, threaded engagements, and/or welded portions. As one example, the first portion of the spring carrier may be provided with an internal, female threaded end portion sized and configured for threaded engagement with an external, male threaded portion of the valve body bonnet portion.

Many different arrangements may be used to rotationally secure the second end portion 22 of the torsion spring 20 to the stem interlock portion 77, either directly or using one or more intermediary attachment components. For example, the second end portion 22 of the torsion spring 20 may be secured to the stem interlock portion 77 using one or more fasteners, clamps, keyed/splined connections, threaded engagements, and/or welded portions. As one example, the second end portion of the torsion spring may be provided with an internal counterbore surface having interlocking features (e.g., splines, grooves, roughened/high friction or knurled surfaces) that interlock with corresponding interlocking features on a mating shoulder surface on the stem interlock portion.

The exemplary stem 70 has a length sufficient to accommodate the preloaded spring return cartridge 10 and valve handle 90. While the stem 70 may be formed as a unitary or monolithic stem component with integrally formed stem interlock portion 77 and end portion 78, in some embodiments, the stem interlock portion 77 and end portion 78 may be provided on a separate stem extension (shown schematically at 71) securable to a new or existing valve stem 55, for example, to provide for retrofit installation of a spring return handle with an existing rotary actuated valve. The stem extension may be secured to the valve stem using a variety of arrangements, including, for example, fasteners, clamps, keyed/splined connections, threaded engagement, and welding. In one such example, the stem extension may include a lower bore receiving the valve stem and a set screw securable with a flatted portion of the valve stem, to fix the stem extension against rotational and axial movement on the valve stem.

In some embodiments, according to an exemplary aspect of the present disclosure, the spring carrier may be a separate component assembled with the torsion spring and adapted to pre-load the torsion spring before assembly with a valve, for example, to facilitate installation on a valve.

FIGS. 3 and 4 illustrate an exemplary embodiment of a preloaded spring return cartridge 110 includes a torsion spring 120 and a spring carrier 130. A first (e.g., lower) end portion 121 of the torsion spring 120 is rotationally fixed to a first (e.g., lower end) portion 131 of the spring carrier 130, and a second (e.g., upper) end portion 122 of the torsion spring is rotatably fixed to a second (e.g., upper end) portion 132 of the spring carrier, such that the second end portion of the torsion spring is rotatable with respect to the spring carrier and with respect to the first end portion of the torsion spring, by torsional or twisting movement of an intermediate or medial (e.g., coiled) portion 123 of the torsion spring, between first and second rotational positions. The second end portion 122 of the torsion spring 120 is secured to the second portion 132 of the spring carrier 130 with the intermediate portion 123 of the torsion spring in a preloaded or energized condition, such that the torsion spring second end portion is held in the first rotational position absent application of a rotational force to the torsion spring second end portion.

Many different types of torsion spring elements may be used in a preloaded spring return cartridge, including, for example, one or more conventional coil spring components. In an exemplary arrangement, as shown in FIGS. 3 and 4, the torsion spring 120 may include an intermediate spring-loaded coiled portion 123 disposed between a first end cuff or collar 121 and a second end cuff or collar 122 secured with (e.g., fastened to, welded to, or integrally formed with) the spring-loaded portion. The first and second end collars 121, 122 may provide one or more attachment points to the spring carrier 130 and stem 170, as described in greater detail below. In the illustrated embodiment, the spring-loaded coiled portion 123 has a helical configuration. In other embodiments, the spring loaded portion may utilize other configurations, including, for example, a spiral or clock-type spring configuration, similar to that shown in the embodiment of FIGS. 8A-9, described in greater detail below.

As shown in FIG. 3, the torsion spring may be a unitary or monolithic component, with the first and second end collars 121, 122 integrally formed with, and extending from, the helical coiled intermediate spring-loaded portion 123. As shown, the second end collar 122 may have an outer diameter that substantially matches an outer diameter of the intermediate spring-loaded portion 123 of the torsion spring 120. Use of a machined torsion spring, as shown, may allow for custom attachments, such as the end collar attachments described herein, thereby eliminating additional torsion-bearing connections between the spring and the stem and handle. As a result, the unitary spring may apply a "pure moment," meaning that the torsion spring does not apply a translative (side load) force. This may allow for the elimination of one or more external stabilizing components that could otherwise be needed.

Many different arrangements may be used to rotationally secure the first end portion 121 of the torsion spring 120 to the first portion 131 of the spring carrier 130, either directly or using one or more intermediary attachment components. For example, the first end portion 121 of the torsion spring 120 may be secured to the first portion 131 of the spring carrier 130 using one or more fasteners, clamps, keyed/splined connections, threaded engagements, and/or welded portions. In some arrangements, as shown in the illustrated embodiment, the first end collar 121 of the torsion spring 120 is provided with one or more fastener holes or apertures 124 that align with corresponding fastener holes or apertures 134 in the first portion 131 of the spring carrier 130, with fasteners 144 (e.g., pins, machine screws, rivets, etc.) installed therethrough to rotationally secure the first end portion of the torsion spring to the first portion of the spring carrier.

Many different arrangements may be used to rotatably secure the second end portion 122 of the torsion spring 120 to the second portion 132 of the spring carrier 130, either directly or using one or more intermediary attachment components. For example, the second end portion 122 of the torsion spring 120 may be secured to the second portion 132 of the spring carrier 130 using one or more fasteners, clamps, keyed/splined connections, threaded engagements, and/or welded portions. In some arrangements, as shown in the illustrated embodiment, the second end collar 122 of the torsion spring 120 is provided with one or more fastener holes or apertures 125 that align with corresponding cutouts or slots 135 in the second portion 132 of the spring carrier 130, with fasteners 145 (e.g., pins, machine screws, rivets, etc.) installed therethrough to rotatably secure the second end portion of the torsion spring to the second portion of the spring carrier. The slots 135 may be sized to define a range of rotational movement (e.g., about 90° for a quarter turn valve) of the torsion spring second end portion 122 with respect to the spring carrier 130 (and the valve to which the spring carrier is affixed), providing first (spring return) and second (user actuated) limit positions for the torsion spring second end portion (and the stem to which the spring second end portion is affixed) corresponding to engagement of the fastener(s) 145 with the ends of the slot(s) 135.

In an exemplary method of assembling the preloaded spring return cartridge 110, the torsion spring 120 is inserted or sleeved within the spring carrier 130, with the fastener holes 124 in the first end collar 121 aligned with the fastener holes 134 in the spring carrier first portion 131. Spring pins 144 (or other suitable fasteners) are installed through the aligned fastener holes 124, 134 to rotatably secure the first portions 121, 131 of the torsion spring 120 and spring carrier 130. The second end collar 122 of the torsion spring 120 is rotated (e.g., counterclockwise) to align the fastener holes 125 in the torsion spring second end collar 122 with the slots 135 in the spring carrier second portion 132. Lock pins 145 (or other suitable fasteners) are installed in the torsion spring second end fastener holes 124, to extend through the spring carrier slots 135, such that the lock pins are spring biased into engagement with first ends of the slots to maintain a preloaded or energized condition of the torsion spring coiled portion 123 in a first rotational position of the second end collar 122.

FIGS. 5 and 6A-6D illustrate the preloaded spring return cartridge 110 assembled with an exemplary rotary valve 150 and valve handle 190, for user actuation of the valve. The valve 150 includes a valve body 151 defining an interior cavity 152 retaining a valve element 156 connected to or secured with (e.g., integral to or assembled with) a stem 170. While many different types of valve elements may be utilized, in the illustrated embodiment, the valve element includes a ball portion 156 including a ball orifice 154 that is misaligned with first and second end ports 161, 162 in the valve body 151 in a closed position to block passage of fluid through the valve 150, and is aligned with the valve body end ports in an open position to permit passage of fluid through the valve.

The interior cavity 152 extends to an upper bonnet portion 153 of the valve body 151 from which the stem 170 extends. The stem 170 is rotatable between a first position (e.g., closed position, reduced flow position, first switching position) and a second position (e.g., open position, increased flow position, second switching position) to adjust the position of the valve element 156.

In the illustrated embodiment, the valve 150 includes a seat and stem sealing arrangement 165 in the valve cavity 152 to seal the valve against seat and stem leakage. In other embodiments, other sealing arrangements may be utilized. Further, while the illustrated embodiment includes a valve closure or shutoff valve element, other types of valve elements may be used, including, for example, flow regulating or flow switching valve elements.

The bonnet portion 153 of the valve body 151 includes an internal threaded portion 163 for assembly of a stem nut 164 retaining the stem 170 with the valve body. The stem 170 includes an upper portion that extends beyond the bonnet portion 153 for attachment to the spring return handle arrangement 110, as described below.

As shown, the first portion 131 of the spring carrier 130 is rotationally fixed to the valve body 151 (e.g., to the bonnet portion 153 of the valve body), and the second end portion 122 of the torsion spring 120 is rotationally fixed to an interlock portion 177 of the stem 170. The valve handle 190 is rotationally fixed to an end 178 of the stem 170 (e.g., using a set screw 176 installed through the valve handle 190 and tightened against a flatted portion of the stem end portion 178), to allow for user rotation of the stem and torsion spring second end portion 122 from the first rotational position toward the second rotational position, against the biasing force of the preloaded torsion spring 120, for example, by grasping and rotating the valve handle. Upon release of the valve handle 190, the torsion spring second end portion 122, stem 170, and valve handle are rotated by the spring biasing force back to the first rotational position.

Many different arrangements may be used to rotationally secure the first portion 131 of the spring carrier 130 to the valve body 151, either directly or using one or more intermediary attachment components. For example, the first portion 131 of the spring carrier 130 may be secured to the valve body 151 using one or more fasteners, clamps, keyed/splined connections, threaded engagements, and/or welded portions. In some arrangements, as shown in the illustrated embodiment, the first portion 131 of the spring carrier 130 includes an internal, female threaded portion 136 sized and configured for threaded engagement with an external, male threaded portion 166 of the valve body bonnet portion 153. As shown, the first portion 131 of the spring carrier 130 may be provided with a plurality of flats 137, for example, to facilitate threaded assembly (or disassembly) of the spring carrier with the valve body 151 using a torque wrench or other such tool.

Many different arrangements may be used to rotationally secure the second end portion 122 of the torsion spring 120 to the stem interlock portion 177, either directly or using one or more intermediary attachment components. For example, the second end portion 122 of the torsion spring 120 may include a spring interlock portion 127 secured to the stem interlock portion 177 using one or more fasteners, clamps, keyed/splined connections, threaded engagements, and/or welded portions. In some arrangements, as shown in the illustrated embodiment, the second end collar 122 of the torsion spring 120 includes an internal counterbore surface 129 having interlocking features (e.g., splines, grooves, roughened/high friction or knurled surfaces) that interlock with corresponding interlocking features on a mating shoulder surface 179 on the stem interlock portion 177. As one example, laser engraved or machined ridges may be provided on the mating counterbore and shoulder surfaces 129, 179 to provide interlocking engagement. These interlocking features may allow for interlocking engagement of the stem 170 with the spring second end portion 122 in many or nearly any relative rotational position, for example, to provide the valve handle (for which orientation on the valve stem may be limited) in a desired spring return orientation on the valve. A hex nut 167 may be threadably installed on the stem end portion 178 and tightened against the second end collar 122 of the torsion spring 120 to maintain interlocking engagement between the mating counterbore and shoulder surfaces 129, 179. As shown, the counterbore and shoulder surfaces 129, 179 may, but need not, be substantially frustoconical, for example, to facilitate secure interlocking engagement between the surfaces when the hex nut 167 is sufficiently tightened.

Figure 6A:
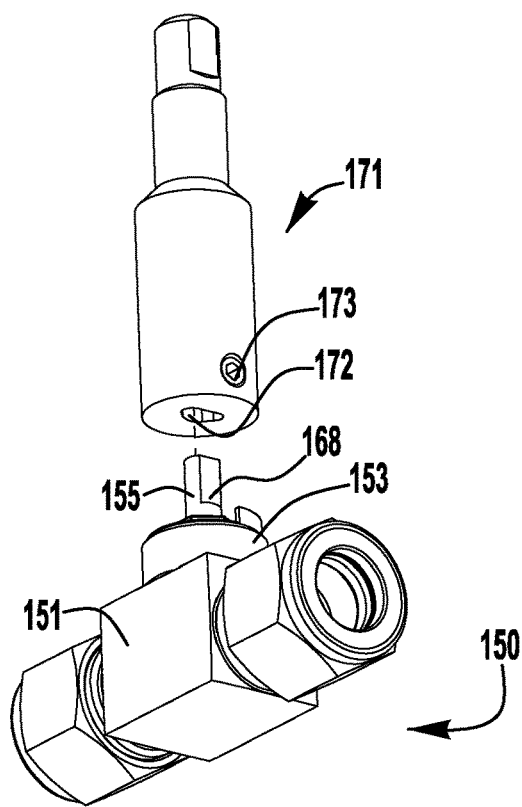
FIGS. 6A-6D illustrate perspective views of the valve assembly of FIG. 5, during an exemplary assembly process.
Figure 6B:
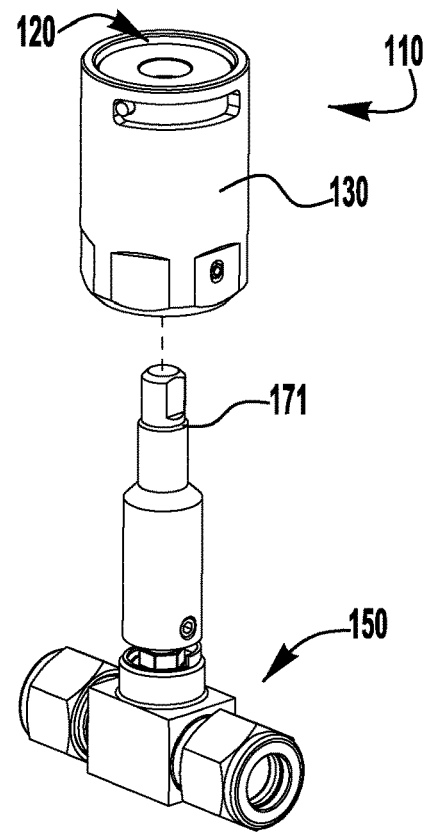
Figure 6C:
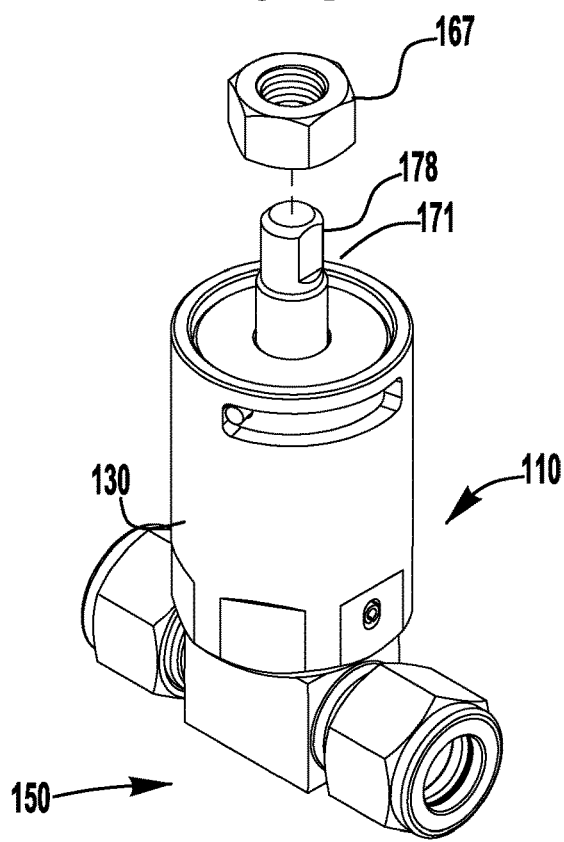
Figure 6D:
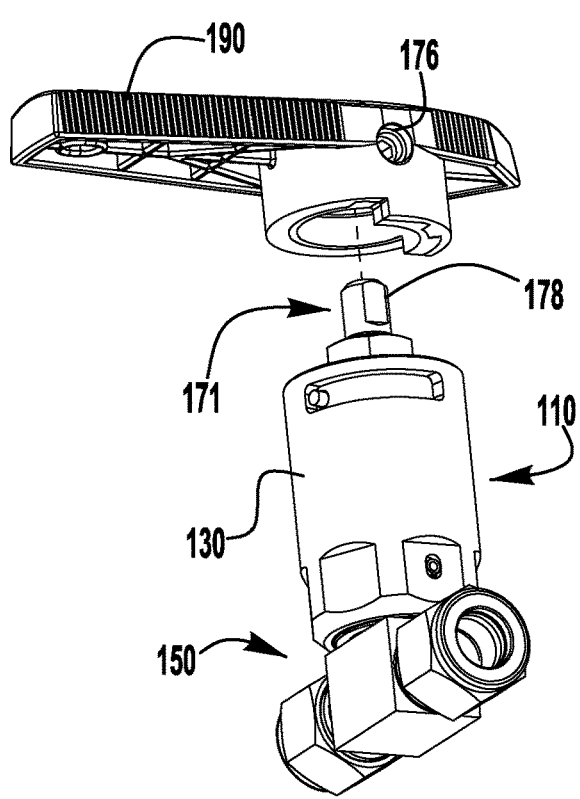
Figure 7A:
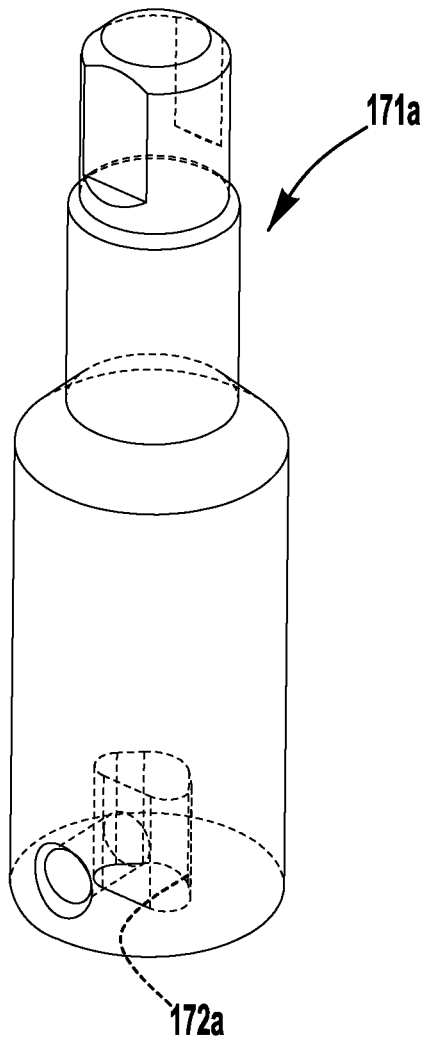
FIG. 7A illustrates an exemplary stem extension having a triangular lower bore.
Figure 7B:
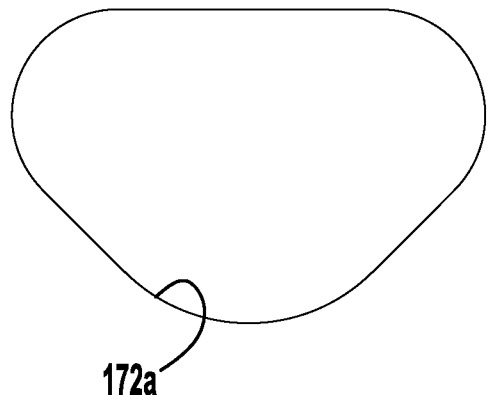
FIG. 7B is a plan view of the triangular lower bore of the stem extension of FIG. 7A.

The exemplary stem 170 has a length sufficient to accommodate the preloaded spring return cartridge 110 and valve handle 190. While the stem 170 may be formed as a unitary or monolithic stem component with integrally formed stem interlock portion 177 and end portion 178, in some arrangements—including the illustrated embodiment, the stem interlock portion 177 and end portion 178 are provided on a separate stem extension 171 securable to a new or existing valve stem 155, for example, to provide for retrofit installation of a spring return handle with an existing rotary actuated valve. The stem extension 171 may be secured to the existing valve stem using a variety of arrangements, including, for example, fasteners, clamps, keyed/splined connections, threaded engagement, and welding. In some arrangements, as shown in the illustrated embodiment, the stem extension 171 includes a lower bore 172 receiving the valve stem 155 and a set screw 173 securable with a flatted portion 168 of the valve stem 155. As shown in FIGS. 6A, 7A, and 7B, the lower bore 172, 172a may be provided in a keyed shape (e.g., triangular, semicircular) to interlockingly receive the flatted portion 168 of the valve stem 155, for example, to more rigidly or robustly rotationally affix the stem extension 171, 171a to the valve stem 155. The stem extension 171 may include a larger diameter lower portion, below the shoulder surface 179, and a smaller diameter upper portion, above the shoulder surface, to closely match the larger and smaller inner diameter portions of the central bore of the spring return cartridge 110.

In an exemplary method of installing the preloaded spring return cartridge 110 and valve handle 190 on a valve 150, as shown in FIGS. 5 and 6A-6D, the stem extension 171 is assembled with the valve stem 155, with the flatted portion 168 of the valve stem 155 inserted in the lower bore 172 of the stem extension (FIG. 6A), and a set screw 173 (or other suitable fastener) tightened against the valve stem flatted portion 168. With the valve stem 155 in the desired "spring return" rotational position, the stem extension 171 is inserted through the torsion spring 120 (FIG. 6B) such that the shoulder surface 179 of the stem extension is in mating engagement with the counterbore surface 129 of the torsion spring second end collar 122. The hex nut 167 is threaded onto the stem extension interlock portion 177 and tightened against the second end collar 122 of the torsion spring 120 (FIG. 6C) to maintain interlocking engagement between the mating counterbore and shoulder surfaces 129, 179. The valve handle 190 is assembled with the flatted portion of the stem end portion 178 (FIG. 6D) using a set screw 176 installed through the valve handle 190 and tightened against a flatted portion of the stem extension end portion 178.

In some embodiments, according to an exemplary aspect of the present disclosure, the spring carrier may be integrally formed with the torsion spring (e.g., as a surrounding sleeve or housing) and adapted to pre-load the torsion spring before assembly with a valve, for example, to facilitate installation on a valve. Such an arrangement may, for example, provide for a smaller, more compact design.

Figure 8A:
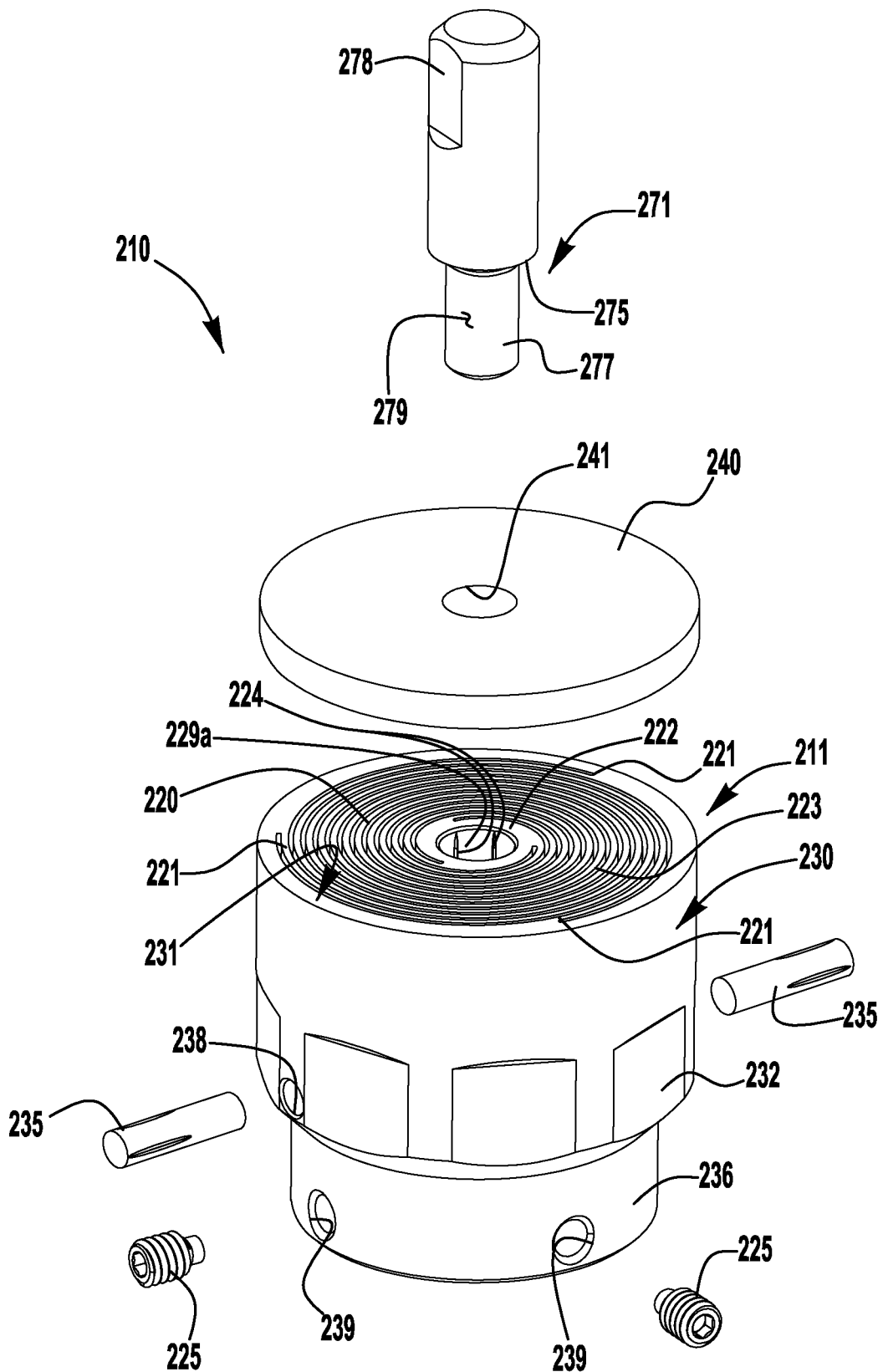
FIG. 8A is an exploded perspective view of a pre-loadable spring return cartridge for a rotary actuated valve, according to an exemplary embodiment of the present disclosure.
Figure 8B:
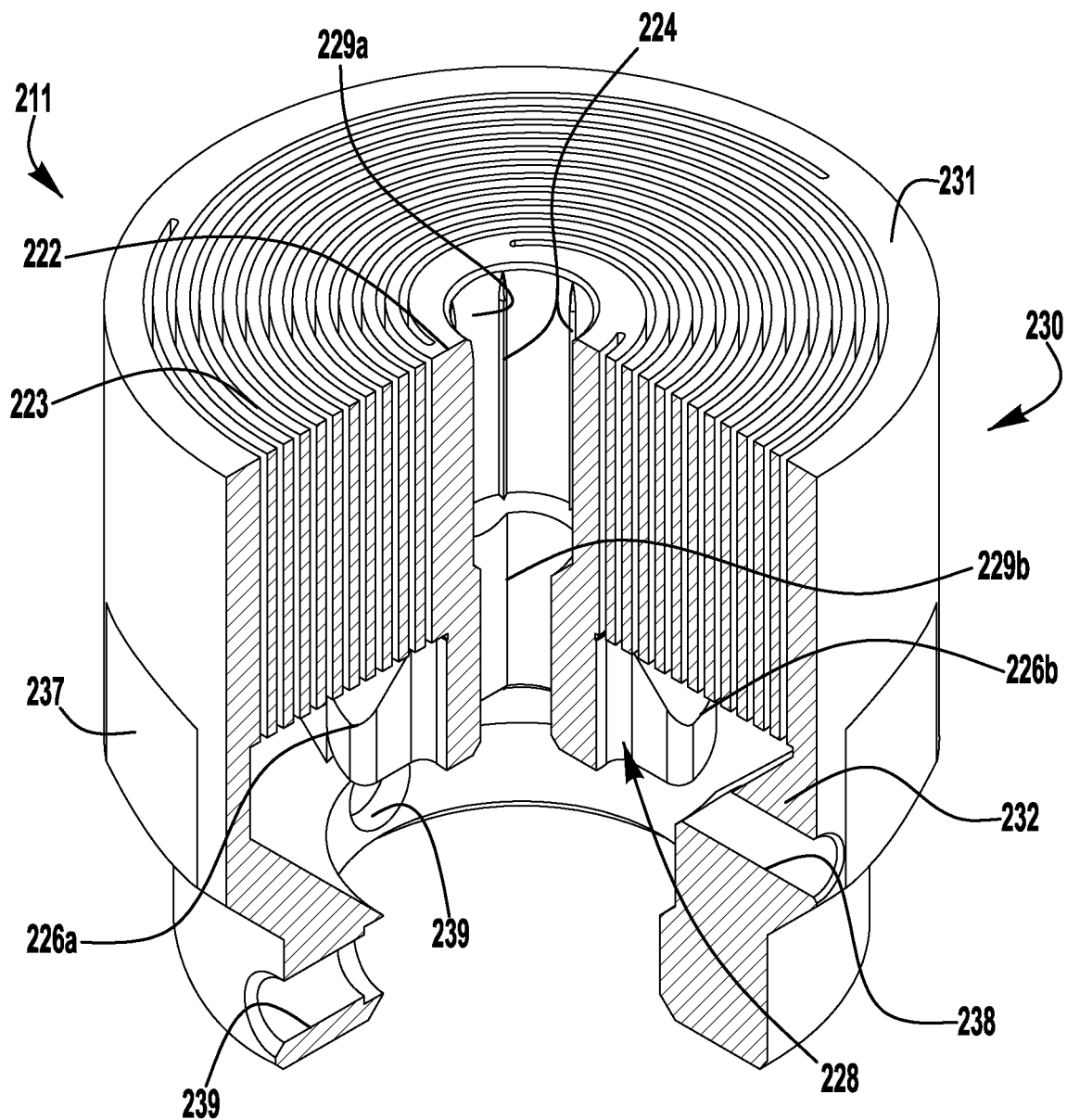
FIG. 8B is a partial cross-sectional perspective view of a spring return cartridge element of the spring return cartridge of FIG. 8A.
Figure 8C:
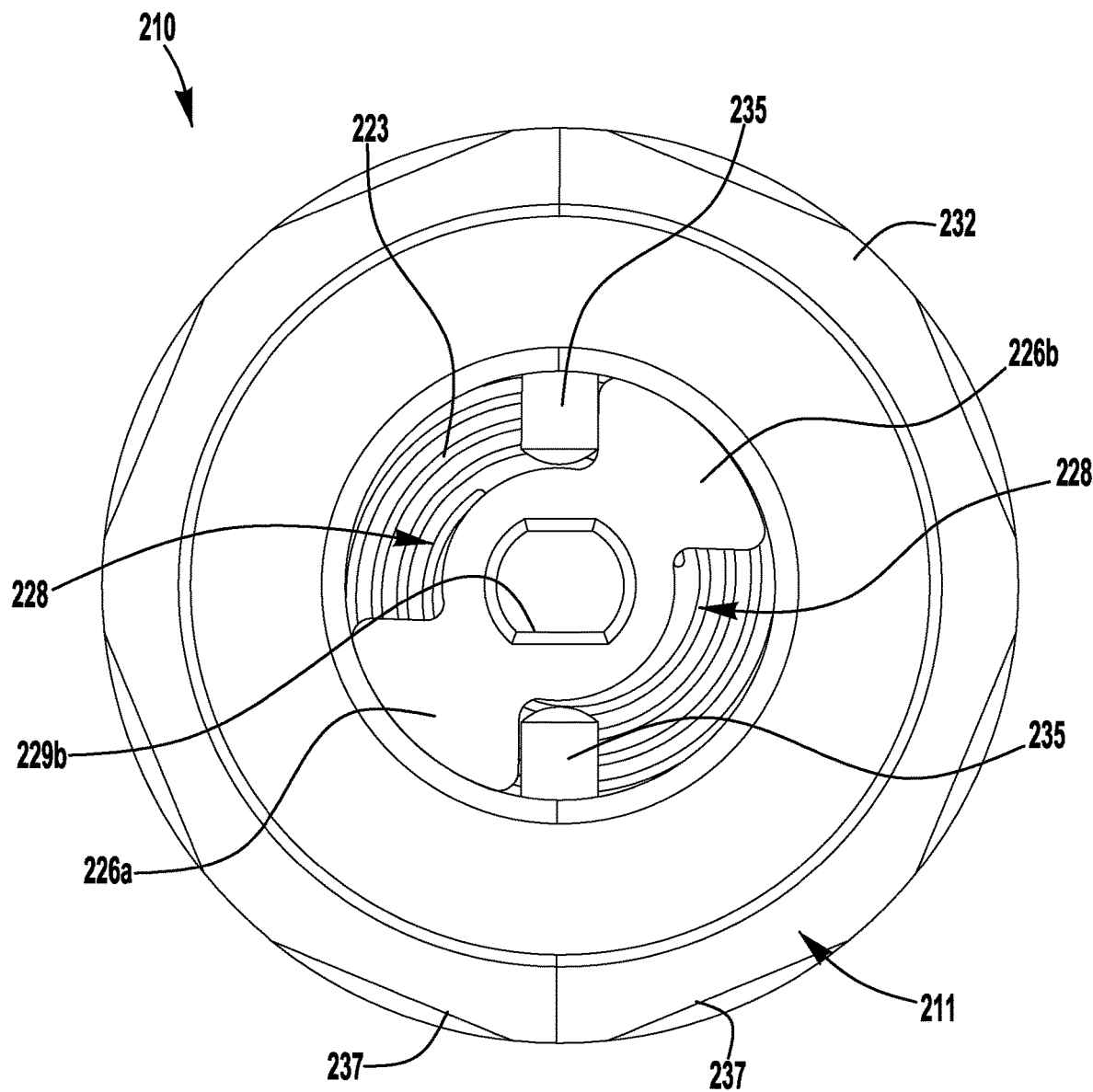
FIG. 8C is a bottom view of the spring return cartridge of FIG. 8A, shown in a preloaded configuration.

FIGS. 8A, 8B, and 8C illustrate an exemplary embodiment of a preloaded spring return cartridge 210 includes a spring return cartridge element 211 having a spiral or clock-type torsion spring 220 integrally formed with (e.g., by machining or additive manufacturing) a spring carrier 230. A first (e.g., radially outer) end portion 221 of the torsion spring 220 is rotationally fixed to a first (e.g., upper inner diameter wall) portion 231 of the spring carrier 230, and a second (e.g., radially inner) end portion 222 of the torsion spring is rotatably fixed to a second (e.g., lower offset inner diameter wall) portion 232 of the spring carrier, such that the second end portion of the torsion spring is rotatable with respect to the spring carrier and with respect to the first end portion of the torsion spring, by torsional or twisting movement of an intermediate or medial (e.g., spiral coiled) portion 223 of the torsion spring, between first and second rotational positions. The second end portion 222 of the torsion spring 220 is rotatably secured to or engaged with the second portion 232 of the spring carrier 230 with the intermediate portion 223 of the torsion spring in a preloaded or energized condition, such that the torsion spring second end portion is held in the first rotational position absent application of a rotational force to the torsion spring second end portion.

Many different types of torsion spring elements may be used in a preloaded spring return cartridge, including, for example, one or more conventional coil spring components. In an exemplary arrangement, as shown in FIGS. 8A and 8B, the torsion spring 220 may include an intermediate spring-loaded coiled portion 223 disposed between first end outer radial starts 221, integrally formed with and extending radially inward from the upper inner diameter wall portion 231 of the spring carrier 230, and a central shaft 222 integrally formed with the coiled portion 223. The central shaft 222 may provide one or more attachment points to the valve stem and/or stem extension, as described in greater detail below. Integral formation of the torsion spring 220 with the spring carrier 230, and use of multiple, evenly spaced spiral spring starts 221 (e.g., three starts as shown), may facilitate application of a "pure moment," meaning that the torsion spring does not apply a translative (side load) force. This may allow for the elimination of one or more external stabilizing components that could otherwise be needed.

The spiral spring configuration of the torsion spring 220 may be adapted to provide an appropriate torque output to the spring loaded handle and valve stem, for example, by selecting the height of the spring (greater height for larger torque output, smaller height for smaller torque output) or the number of spring starts (more starts for larger torque output, fewer starts for smaller torque output).

Figure 9:
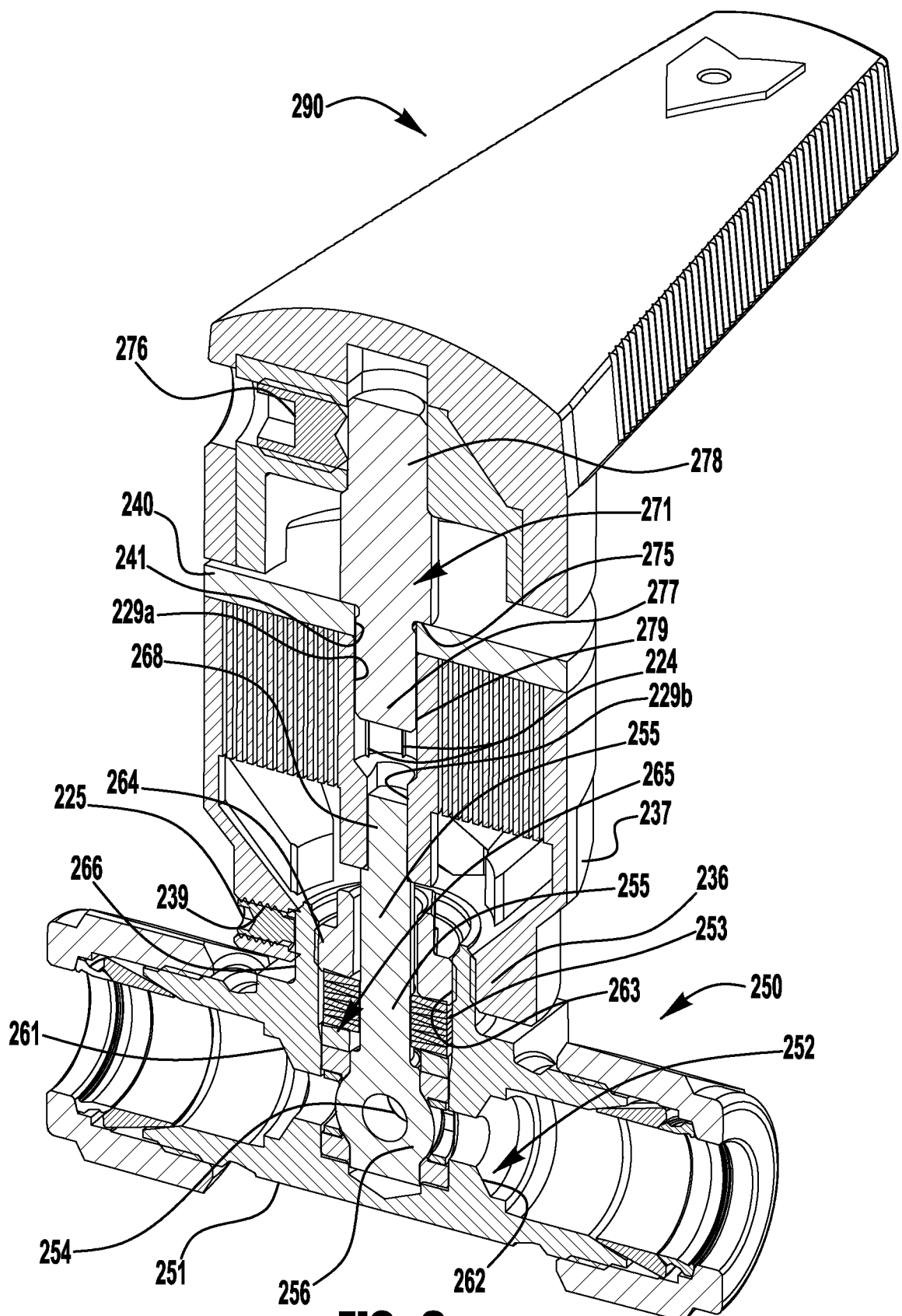
FIG. 9 is a cross-sectional perspective view of a valve assembly including the spring return cartridge of FIG. 8, shown in a preloaded configuration, according to an exemplary embodiment of the present disclosure.

Many different arrangements may be used to rotatably secure the second, inner radial shaft portion 222 of the torsion spring 220 to the second, lower inner diameter offset portion 232 of the spring carrier 230, either directly or using one or more intermediary attachment components. For example, as shown in FIGS. 8B and 8C, the shaft 222 of the torsion spring 220 may be provided with radially outward extending bearing portions 226a, 226b defining one or more arcuate recesses 228, and the lower inner diameter offset portion 232 of the spring carrier 230 may be provided with one or more radially inward extending projections 235 received in the corresponding arcuate recesses. As shown in the embodiment of FIGS. 8A-9, the projections 235 may be provided as pins press fit or otherwise installed through holes 238 in the lower offset portion 232. In other embodiments, the projections may be integrally formed with the spring carrier, as described in greater detail below.

The recesses 228 may be sized to define a range of rotational movement (e.g., about 90° for a quarter turn valve) of the torsion spring second end portion 222 with respect to the spring carrier 230 (and the valve to which the spring carrier is affixed), providing first (spring return) and second (user actuated) limit positions for the torsion spring second end portion (and the stem to which the spring second end portion is affixed) corresponding to engagement of the projections 235 with the recess defining bearing portions 226a, 226b. In other embodiments (e.g., similar to the embodiment of FIGS. 3-6D), the inner diameter wall of the spring carrier may be provided with arcuate slots or recesses receiving radial projections from the central shaft to define a range of rotational movement of the torsion spring second end portion with respect to the spring carrier.

In an exemplary method of preloading the spring return cartridge 210, the shaft 222 is rotated with respect to the spring carrier 230 (e.g., at least about 90° from an unloaded orientation) to (e.g., at or slightly beyond) a first rotational limit position in which the torsion spring coil portion 223 is in a spring loaded condition. One or more pins 235 are installed (e.g., press fit) through radially extending holes 238 in the lower inner diameter offset portion 232 of the spring carrier 230. The spring loaded intermediate portion 223 of the torsion spring 230 biases the first rotational limit defining bearing portion 226a of the central shaft 222 against the installed pin 235 to hold the pre-loaded spring shaft 222 in the first rotational limit position. When a rotational force or torque is applied to the shaft 222 against the torsion spring biasing force, engagement of the second rotational limit defining bearing portion 226b against the installed pin 235 limits rotation of the shaft to the second rotational limit position.

Figure 10C:
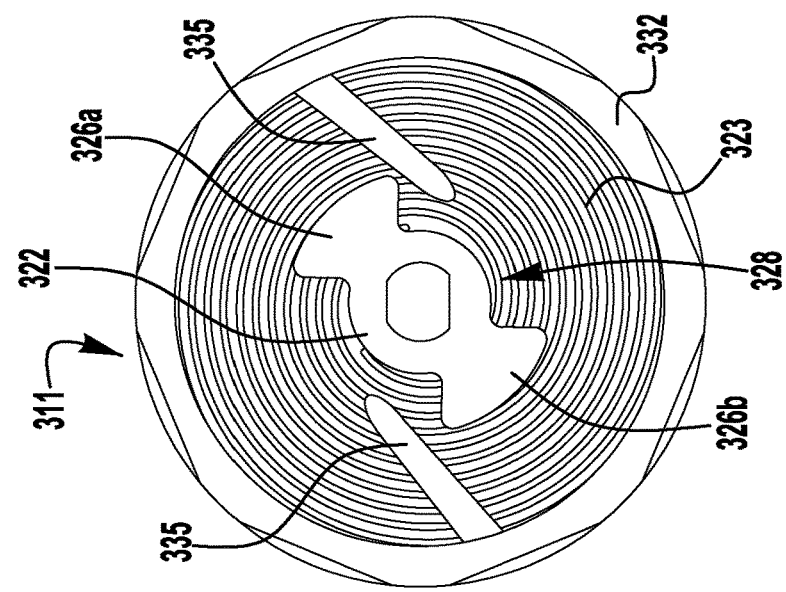
FIG. 10C is a bottom view of the spring return cartridge of FIG. 10A, shown in a second rotational limit position.
Figure 10B:
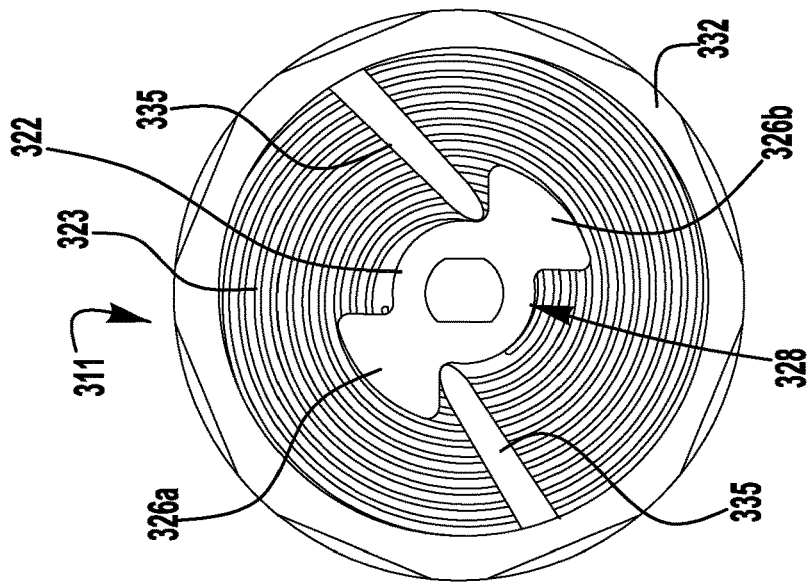
FIG. 10B is a bottom view of the spring return cartridge of FIG. 10A, shown in a preloaded first rotational limit position.
Figure 10A:
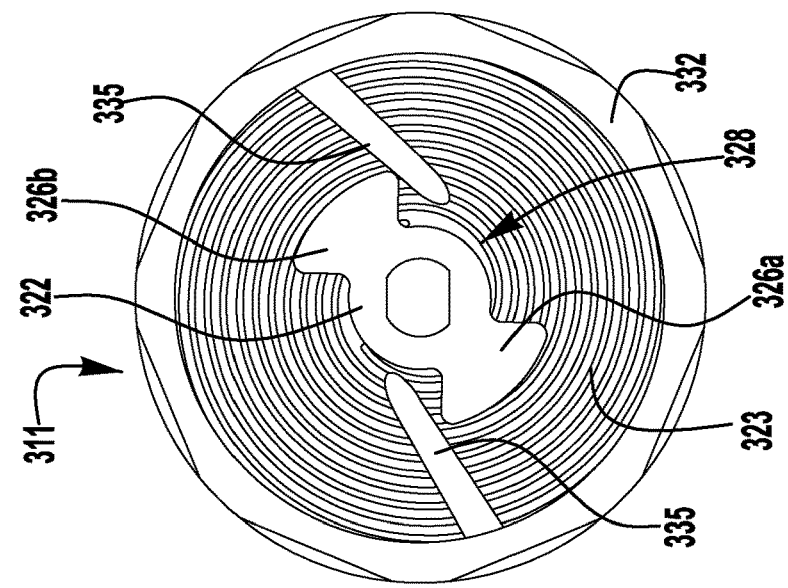
FIG. 10A is a bottom view of a spring return cartridge having a spring carrier with integrally formed flexible interlock portions, according to an exemplary embodiment of the present disclosure, shown in an unloaded condition.

In some embodiments, the preloading interlock features of the spring return cartridge may be integrally formed with the spring carrier and may, for example, be elastically deformable during preloading rotation of the spring cartridge shaft for radial alignment with the arcuate recesses when the spring carrier cartridge element is preloaded. FIGS. 10A, 10B, and 10C illustrate a bottom view of an exemplary spring return cartridge element 311 having fins or other such projections 335 extending radially inward from the spring carrier lower offset portion 332, and radially outward extending bearing portions 326a, 326b defining arcuate recesses 328. To preload the spring return cartridge element 311, the central shaft 322 is rotated (i.e., clockwise in the view shown in FIGS. 10A-10C) from an unloaded condition (FIG. 10A) to the first rotational limit position (FIG. 10B), with the projections 335 engaging the bearing portions 326a, 326b to elastically deform out of radial alignment with the arcuate recesses 328, and then snap elastically inward into the arcuate recesses when the shaft is in the first rotational limit position. In the first rotational limit position, the ends 335a of the projections 335 engage the bearing portions 326a, 326b to secure the spring return cartridge element in preloaded first rotational limit position. From the first rotational limit position, the shaft 322 is further rotatable to the second rotatable limit position (FIG. 10C), against the torsion forces of the spring loaded coiled portion 323. While torsion limits of the torsion spring coil portion 323 may provide a positive stop in the second rotational limit position, in other embodiments, other spring return cartridge, handle, and/or valve elements may define a positive stop in the second rotational limit position.

Figure 11:
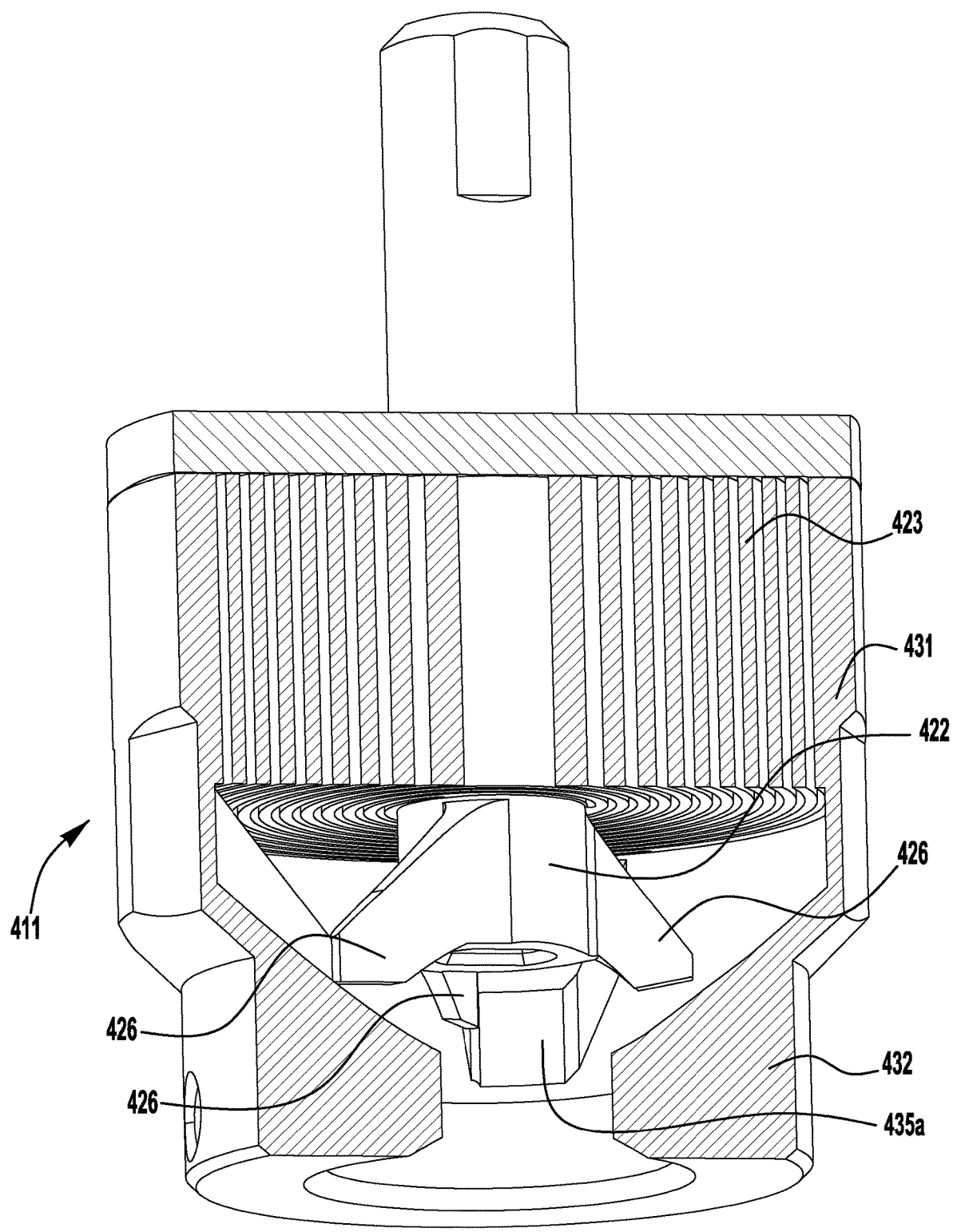
FIG. 11 is a cross-sectional perspective view of a spring return cartridge having a central shaft with integrally formed flexible interlock portions, according to another exemplary embodiment of the present disclosure, shown in an unloaded condition.

In other embodiments, the preloading interlock features of the spring return cartridge may be integrally formed with the central shaft and may, for example, be elastically deformable during preloading rotation of the spring cartridge shaft for radial alignment with inner peripheral recesses of the spring carrier when the spring carrier cartridge element is preloaded. FIG. 11 illustrates a cross-sectional perspective view of an exemplary spring return cartridge element 411 having fins or other such projections 426 extending radially outward from the shaft 422, and bearing portions 435a, 435b, 435c extending radially inward from the spring carrier lower offset portion 432 to define arcuate recesses 438. To preload the spring return cartridge element 411, the central shaft 422 is rotated (i.e., clockwise in the view shown in FIGS. 11A-11C) from an unloaded condition (FIG. 11A) to the first rotational limit position (FIG. 11B), with the projections 426 engaging the bearing portions 435 to flex or elastically deform inward and out of radial alignment with the arcuate recesses 438, and then snap elastically outward into the arcuate recesses when the shaft is in the first rotational limit position. In the first rotational limit position, the ends 426a of the projections 426 engage the bearing portions 435 to secure the spring return cartridge element in preloaded first rotational limit position. From the first rotational limit position, the shaft 422 is further rotatable to the second rotatable limit position (FIG. 11C), against the torsion forces of the spring loaded coiled portion 423. While torsion limits of the torsion spring coil portion 423 may provide a positive stop in the second rotational limit position, in other embodiments, other spring return cartridge, handle, and/or valve elements may define a positive stop in the second rotational limit position.

FIG. 9 illustrates the preloaded spring return cartridge 210 of FIGS. 8A-8C assembled with an exemplary rotary valve 250 and valve handle 290, for user actuation of the valve. The valve 250 and valve handle 290 may be similarly assembled with the spring return cartridge elements 311, 411 of FIGS. 10A-11C using any one or more of the features described below, and any of the spring return cartridges and spring return cartridge elements may be assembled with a wide variety of valves and valve handles.

The valve 250 includes a valve body 251 defining an interior cavity 252 retaining a valve element 256 connected to or secured with (e.g., integral to or assembled with) a valve stem 255. While many different types of valve elements may be utilized, in the illustrated embodiment, the valve element includes a ball portion 256 including a ball orifice 254 that is misaligned with first and second end ports 261, 262 in the valve body 251 in a closed position to block passage of fluid through the valve 250, and is aligned with the valve body end ports in an open position to permit passage of fluid through the valve.

The interior cavity 252 extends to an upper bonnet portion 253 of the valve body 251 from which the valve stem 255 extends. The valve stem 255 is rotatable between a first position (e.g., closed position, reduced flow position, first switching position) and a second position (e.g., open position, increased flow position, second switching position) to adjust the position of the valve element 256.

In the illustrated embodiment, the valve 250 includes a seat and stem sealing arrangement 265 in the valve cavity 252 to seal the valve against seat and stem leakage. In other embodiments, other sealing arrangements may be utilized. Further, while the illustrated embodiment includes a valve closure or shutoff valve element, other types of valve elements may be used, including, for example, flow regulating or flow switching valve elements.

The bonnet portion 253 of the valve body 251 includes an internal threaded portion 263 for assembly of a stem nut 264 retaining the valve stem 255 with the valve body. The valve stem 255 includes an upper portion that extends beyond the bonnet portion 253 for attachment to the spring return handle arrangement 210, as described below. While the valve stem may extend through the spring return cartridge for direct attachment to a valve handle, in the illustrated embodiment, a stem extension 271 is attached to the valve stem 255 (e.g., by the bore portions 229a, 229b of the shaft 222, as shown) to form an extended valve stem arrangement, as described in greater detail below.

As shown, the first portion 231 of the spring carrier 230 is rotationally fixed to the valve body 251 (e.g., to the bonnet portion 253 of the valve body), and the second end portion or shaft 222 of the torsion spring 220 is rotationally fixed to an interlock portion or lower end portion 277 of the stem extension 271. The valve handle 290 is rotationally fixed to an upper end 278 of the stem extension 271 (e.g., using a set screw 276 installed through the valve handle 290 and tightened against a flatted portion of the stem extension upper end 278), to allow for user rotation of the valve stem and torsion spring second end portion or shaft 222 from the first rotational position toward the second rotational position, against the biasing force of the preloaded torsion spring 220, for example, by grasping and rotating the valve handle. Upon release of the valve handle 290, the shaft 222, stem extension 271, and valve handle 290 are rotated by the spring biasing force back to the first rotational position.

Many different arrangements may be used to rotationally secure the first portion 231 of the spring carrier 230 to the valve body 251, either directly or using one or more intermediary attachment components. For example, the first portion 231 of the spring carrier 230 may be secured to the valve body 251 using one or more fasteners, clamps, keyed/splined connections, threaded engagements, and/or welded portions. In some arrangements, as shown in the illustrated embodiment, the first portion 231 of the spring carrier 230 extends to a lower, female threaded collar portion 236 sized and configured for threaded engagement with an external, male threaded portion 266 of the valve body bonnet portion 253. As shown, the collar portion 236 of the spring carrier 230 may be provided with a plurality of flats 237, for example, to facilitate tightening of the spring carrier with the valve body 251 using a torque wrench or other such tool. Set screws 225 may be installed through holes 239 in the female threaded collar portion 236 to secure the collar portion against inadvertent threaded rotation of the spring return cartridge 210 on the valve body 251. The set screws 225 may be provided with a soft (e.g., brass) tip to minimize marring of the bonnet threads. In other embodiments, other configurations may be used to fix the spring return cartridge against rotation, including, for example, a split ring clamp or other clamping feature, assembled with or integrally formed with the spring carrier.

Many different arrangements may be used to rotationally secure the shaft 222 of the torsion spring 220 to the stem extension lower end portion 277, either directly or using one or more intermediary attachment components. For example, the shaft 222 of the torsion spring 220 may include a spring interlock portion secured to the stem extension lower end portion 277 using one or more fasteners, clamps, keyed/splined connections, threaded engagements, and/or welded portions. In some arrangements, as shown in the illustrated embodiment, the shaft 222 of the torsion spring 220 includes an internal upper bore portion 229a having interlocking features (e.g., splines, grooves, roughened/high friction or knurled surfaces) that interlock with an outer peripheral surface 279 on the stem extension lower end portion 277. As one example, circumferentially spaced ribs or nubs 224 may be provided in the internal bore 229a to facilitate rotationally fixed press fit engagement between the shaft 222 and the stem extension 271. These interlocking features may allow for interlocking engagement of the stem extension 271 with the shaft 222 in many or nearly any relative rotational position, for example, to provide the valve handle (for which orientation on the valve stem may be limited) in a desired spring return orientation on the valve. In other embodiments (not shown), the stem extension may be rotationally fixed with the shaft by complementary keyed cross-sectional shapes of the stem extension end portion and the shaft upper bore portion. In still other exemplary embodiments, the stem extension may be integrally formed with the spring carrier shaft, thereby eliminating the need for an attachment arrangement.

To protect the torsion spring 220 from moisture or other contamination, a cover plate 240 may be secured over the upper ends of the torsion spring and spring carrier 230. In the illustrated example, the cover plate 240 includes a central hole 241 receiving the lower end portion 277 of the stem extension 271, with a shoulder portion 275 of the stem extension engaging the cover plate to hold the cover plate against the upper ends of the torsion spring and spring carrier. The cover plate 240 may be provided in a plastic material, for example, to reduce friction and noise from rotation against the upper ends of the torsion spring and spring carrier. The cover plate may be provided with an outer peripheral wall or lip that overhangs the upper end of the spring carrier, for example, to further protect against the ingress of contamination.

The exemplary stem arrangement 270 has a length sufficient to accommodate the preloaded spring return cartridge 210 and valve handle 290. While the valve stem may be formed as a unitary or monolithic valve stem component with integrally formed valve stem interlock portion and end portion (not shown), in some arrangements—including the illustrated embodiment, the stem extension lower end portion 277 and upper end portion 278 are provided on a separate stem extension 271 securable to a new or existing valve stem 255 (e.g., by attachment to the shaft 222), for example, to provide for retrofit installation of a spring return handle with an existing rotary actuated valve. The stem extension 271 may be secured to the existing valve stem using a variety of arrangements, including, for example, fasteners, clamps, keyed/splined connections, threaded engagement, and welding. In some arrangements, as shown in the illustrated embodiment, the stem extension 271 is secured with an upper bore portion 229a of the shaft 222, and the valve stem 255 is secured with a lower bore portion 229b of the shaft. As shown, the lower bore portion 229b may be provided in a keyed shape (e.g., triangular, semicircular, single or double flatted bore) to interlockingly receive the complementary shaped flatted portion 268 of the valve stem 255, for example, to more rigidly or robustly rotationally affix the shaft 222 to the valve stem 255. The use of close fitting complementary shaped flatted stem 268 and shaft lower bore portion 229b may eliminate play in the handle rotation without requiring a set screw or other fastener.

To assemble a spring return handle arrangement, for example, for later assembly with a rotary actuated valve, the stem extension 271 is installed in the upper bore portion 229a of the spring return cartridge shaft 222, for example, by press fitting the stem extension lower end 277 into the ribbed upper bore portion. The valve handle 290 is assembled with the upper end portion 278 of the stem extension 271, for example, by tightening a set screw set 276 installed through the valve handle 290 against a flatted portion of the stem extension upper end portion. While the stem extension 271 and valve handle 290 may be assembled to the spring return cartridge 210 after preloading, in other implementations, the stem extension and valve handle may be assembled with the spring return cartridge prior to preloading, for example, for use of the valve handle to apply preloading torque forces to the shaft 222.

In an exemplary method of installing the spring return handle arrangement on a valve 250, the upper flatted portion 268 of the valve stem 255 is partially inserted in the lower stem bore portion 229b of the spring return cartridge shaft 222, and the spring carrier 230 is threadably assembled with the valve body bonnet portion 253, for example, by engaging the flats 237 of the spring carrier collar portion 236 using a wrench or other tool. During this threaded installation, the valve stem 255 rotates within the valve body 251. Once the spring carrier 230 has sufficient threaded engagement with the valve body bonnet portion 253, the spring carrier and the valve stem 255 are rotationally adjusted to the desired "spring return" rotational position (e.g., fully closed position of the valve stem with respect to the valve body 251) and the set screws 225 in the spring carrier collar portion 236 are tightened against the valve body bonnet portion to secure the spring return cartridge against further rotation on the valve body 251. In some implementations, the stem extension 271 and valve handle 290 may be assembled with the spring return cartridge 230 after installation of the spring return cartridge on the valve 250.

The overall shape and structural configuration of the monolithic spring return cartridge element 211, 311, 411 may make the component difficult to manufacture using conventional machining, molding, or casting techniques. According to an aspect of the present disclosure, a spring return cartridge element may be fabricated using additive manufacturing (e.g., 3D printing) to produce a monolithic component having the desired integrally formed shaft, spring and carrier configuration. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), direct energy deposition (laser powder deposition or "LPD," laser wire deposition or "LWD," laser engineered net-shaping or "LENS," electron beam wire deposition), sinter based additive manufacturing such as Binder Jetting Technology (BJT), Mold Slurry Deposition (MSD), Bound Metal Extrusion (BME) and Nanoparticle Jetting Technology (NPJ). Providing a spring return cartridge element as a single, monolithic component may eliminate assembly costs, reduce component wear, reduce adverse effects from heat cycling, improve corrosion behavior (galvanic effects, crevice, stress corrosion cracking), and reduce lead time to manufacture. Further, fabrication using additive manufacturing may reduce the amount of raw material used and may reduce the size and weight of the finished component. The spring return cartridge element may be provided in any suitable material, including, for example, stainless steel.

As shown, the additive manufactured spring return cartridge element 211, 311, 411 provides the spring carrier, stem, and torsion spring as a unitary or monolithic component for assembly with a rotary actuated valve. In other embodiments, any one or more additional or alternative features may be combined in an integral design through additive manufacturing to consolidate parts and/or minimize assembly, including, for example, any one or more of the interlocking projections, fastening elements, cover plate, stem extension, stem retaining nut, and valve stem.

The spring return cartridge element 211, 311, 411 may include structural features and configurations configured to facilitate fabrication using additive manufacturing techniques. For example, the shaft bearing portions and the transition surfaces between the upper wall portion and the offset portion may be provided with a draft angle (e.g., 45° surface) to allow for printing without support material. As another example, the spiral or clock-type torsion spring configuration may be selected to facilitate printability, as compared to a helical spring configuration. In other embodiments, a different spring-loaded configuration may be utilized, including, for example, a helical torsion spring configuration, similar to that shown in the embodiment of FIGS. 3-5.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A spring return cartridge for a rotary actuated valve, the spring return cartridge comprising:
    a torsion spring having a spring-loaded intermediate portion extending between first and second end portions; and
    a spring carrier sleeved with the torsion spring and having a first portion rotationally fixed with the first end portion of the torsion spring, and a second portion rotatably coupled with the second end portion of the torsion spring, such that the second end portion of the torsion spring is rotatable with respect to the spring carrier, and with respect to the first end portion of the torsion spring, between first and second rotational limit positions, with the intermediate portion of the torsion spring biasing the torsion spring second end portion to the first rotational limit position and maintaining a spring-loaded condition in the first rotational limit position;
    wherein the first end portion of the torsion spring includes at least one fastener hole aligned with a corresponding fastener hole in the first portion of the spring carrier, with a fastener installed through the aligned fastener holes to rotationally secure the first end portion of the torsion spring to the first portion of the spring carrier.

2. The spring return cartridge of claim 1, wherein at least one of the first and second end portions of the torsion spring comprises a ring-shaped collar providing one or more attachment points to a corresponding one of the first and second portions of the spring carrier.

3. The spring return cartridge of claim 2, wherein the ring shaped collar of the torsion spring comprises a first end collar of the first end portion.

4. The spring return cartridge of claim 3, wherein the first end collar is integrally formed with the torsion spring intermediate portion.

5. The spring return cartridge of claim 2, wherein the ring shaped collar of the torsion spring comprises a second end collar of the second end portion.

6. The spring return cartridge of claim 5, wherein the second end collar is integrally formed with the torsion spring intermediate portion.

7. The spring return cartridge of claim 2, wherein the ring-shaped collar provides a plurality of attachment points to a corresponding one of the first and second portions of the spring carrier.

8. The spring return cartridge of claim 1, wherein the torsion spring is sleeved within the spring carrier.

9. The spring return cartridge of claim 1, wherein the torsion spring comprises a helical spring.

10. The spring return cartridge of claim 1, wherein the first portion of the spring carrier comprises a lower end portion of the spring carrier and the second portion of the spring carrier comprises an upper end portion of the spring carrier.

11. The spring return cartridge of claim 1, wherein the spring-loaded intermediate portion and the first and second end portions of the torsion spring are formed as a monolithic component.

12. The spring return cartridge of claim 1, wherein the spring carrier is assembled with the torsion spring.

13. A spring return cartridge for a rotary actuated valve, the spring return cartridge comprising:
   a torsion spring having a spring-loaded intermediate portion extending between first and second end portions; and
   a spring carrier sleeved with the torsion spring and having a first portion rotationally fixed with the first end portion of the torsion spring, and a second portion rotatably coupled with the second end portion of the torsion spring, such that the second end portion of the torsion spring is rotatable with respect to the spring carrier, and with respect to the first end portion of the torsion spring, between first and second rotational limit positions, with the intermediate portion of the torsion spring biasing the torsion spring second end portion to the first rotational limit position and maintaining a spring-loaded condition in the first rotational limit position;
   wherein the second end portion of the torsion spring includes at least one fastener hole aligned with a corresponding slot in the second portion of the spring carrier, with a fastener installed in the fastener hole and extending through the slot to rotatably secure the second end portion of the torsion spring to the second portion of the spring carrier.

14. The spring return cartridge of claim 13, wherein the first end portion of the torsion spring includes at least one fastener hole aligned with a corresponding fastener hole in the first portion of the spring carrier, with a fastener installed through the aligned fastener holes to rotationally secure the first end portion of the torsion spring to the first portion of the spring carrier.

15. A spring return handle arrangement for assembly with a valve, the spring return handle arrangement comprising:
   a spring return cartridge comprising:
      a torsion spring having a spring-loaded intermediate portion extending between first and second end portions; and
      a spring carrier sleeved with the torsion spring and having a first portion rotationally fixed with the first end portion of the torsion spring and attachable to a valve body of the valve, and a second portion rotatably coupled with the second end portion of the torsion spring;
   a user graspable valve handle; and
   a stem secured with the spring return cartridge, the stem including an end portion attachable to the valve handle and a stem interlock portion configured to interlock with a spring interlock portion on the second end portion of the torsion spring;
   wherein the stem interlock portion comprises a radially extending annular shoulder on the stem and the spring interlock portion comprises a radially extending annular counterbore in the second end portion of the torsion spring, the annular counterbore receiving the annular shoulder for mating engagement therewith; and
   wherein the spring return handle arrangement further comprises a nut threadable with the stem end portion and configured to be tightened against the spring interlock portion to maintain interlocking engagement between the spring interlock portion and the stem interlock portion.

16. The spring return handle arrangement of claim 15, wherein the shoulder and the counterbore comprise interlocking ridged surfaces.

17. The spring return handle arrangement of claim 15, wherein the shoulder surface and the counterbore surface comprise knurled surfaces.

18. The spring return handle arrangement of claim 15, wherein the stem comprises a stem extension having a lower bore configured to receive a valve stem of the valve.

19. The spring return handle arrangement of claim 15, wherein the second end portion of the torsion spring includes at least one fastener hole aligned with a corresponding slot in the second portion of the spring carrier, with a fastener installed in the fastener hole and extending through the slot to rotatably secure the second end portion of the torsion spring to the second portion of the spring carrier.

20. The spring return handle arrangement of claim 15, wherein the first portion of the spring carrier includes an internal, female threaded portion for threaded engagement with a male threaded portion of the valve body of the valve.

* * * * *